US012665352B2

(12) United States Patent
Takai et al.

(10) Patent No.: US 12,665,352 B2
(45) Date of Patent: Jun. 23, 2026

(54) ELECTRICAL CONNECTOR FOR HIGH-SPEED TRANSMISSION

(71) Applicant: YAMAICHI ELECTRONICS CO., LTD., Tokyo (JP)

(72) Inventors: Yosuke Takai, Tokyo (JP); Toshiyasu Ito, Tokyo (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 343 days.

(21) Appl. No.: 18/339,508

(22) Filed: Jun. 22, 2023

(65) Prior Publication Data

US 2023/0420888 A1 Dec. 28, 2023

Related U.S. Application Data

(60) Provisional application No. 63/354,809, filed on Jun. 23, 2022.

(51) Int. Cl.
*H01R 13/6471* (2011.01)
*H01R 12/72* (2011.01)
*H01R 13/6585* (2011.01)
*H01R 12/73* (2011.01)

(52) U.S. Cl.
CPC ....... *H01R 13/6471* (2013.01); *H01R 12/724* (2013.01); *H01R 12/727* (2013.01); *H01R 13/6585* (2013.01); *H01R 12/73* (2013.01)

(58) Field of Classification Search
CPC .............. H01R 12/724; H01R 13/6741; H01R 13/6599
See application file for complete search history.

(56) References Cited

U.S. PATENT DOCUMENTS 8,167,631 B2 * 5/2012 Ito ........................ H01R 12/721 439/108
8,177,564 B1 5/2012 Ito et al.
8,764,488 B2 * 7/2014 Zeng .................. H01R 13/6585 439/108
9,083,130 B2 * 7/2015 Casher ................... H01R 12/00
(Continued)

FOREIGN PATENT DOCUMENTS

CN 107017526 A 8/2017
CN 113410706 A 9/2021
(Continued)

OTHER PUBLICATIONS

Partial European Search Report for EU serial No. 23180326.3; issued Feb. 27, 2024.

*Primary Examiner* — Marcus E Harcum
(74) *Attorney, Agent, or Firm* — Flener IP & Business Law

(57) ABSTRACT

Provided is a connector having: a top pin group 120 having a plurality of contact pins 121, 122 aligned in a predetermined direction; and a bottom pin group having a plurality of contact pins aligned in the predetermined direction in which the bottom pin group is arranged so as to face the top pin group 120 and located on a mount substrate side. Each of the contact pins 121, 122 is at least either one of a signal pin 122 used for signaling and a ground pin 121 used for grounding, and the top pin group 120 includes a double ground configuration in which sets each including two signal pins 122 aligned between two ground pins 121 are aligned adjacent to each other in the predetermined direction.

9 Claims, 33 Drawing Sheets

(56) References Cited

U.S. PATENT DOCUMENTS

| | | | | |
|---|---|---|---|---|
| 9,337,585 | B1 * | 5/2016 | Yang | H01R 13/6583 |
| 9,455,530 | B2 * | 9/2016 | Patel | H01R 13/6597 |
| 9,509,098 | B1 * | 11/2016 | Henry | H01R 13/6471 |
| 9,531,129 | B2 | 12/2016 | de Boer | |
| 9,531,130 | B1 | 12/2016 | Phillips et al. | |
| 9,705,218 | B2 * | 7/2017 | Ito | H01R 13/6471 |
| 9,759,879 | B1 * | 9/2017 | Takai | H05K 1/117 |
| 9,768,557 | B2 * | 9/2017 | Phillips | H01R 13/6585 |
| 9,819,125 | B2 * | 11/2017 | Regnier | H01R 13/6272 |
| 9,979,136 | B1 * | 5/2018 | Wu | H01R 13/6597 |
| 10,050,369 | B1 * | 8/2018 | Yang | H01R 13/26 |
| 10,283,910 | B1 * | 5/2019 | Chen | H01R 4/04 |
| 10,411,411 | B2 * | 9/2019 | Tang | H01R 13/6582 |
| 10,847,936 | B2 * | 11/2020 | Tang | H01R 13/502 |
| 11,025,013 | B2 * | 6/2021 | Little | H01R 12/72 |
| 11,189,973 | B2 * | 11/2021 | Chen | H01R 13/11 |
| 11,398,693 | B2 * | 7/2022 | Yang | H01R 31/08 |
| 11,843,202 | B2 * | 12/2023 | Chen | H01R 13/6581 |
| 11,942,716 | B2 * | 3/2024 | Liu | H01R 13/6471 |
| 12,308,574 | B2 * | 5/2025 | Huang | H01R 12/7005 |
| 2015/0255904 | A1 | 9/2015 | Ito | |
| 2016/0336691 | A1 | 11/2016 | De Boer | |
| 2017/0018880 | A1 * | 1/2017 | Phillips | H01R 13/6585 |
| 2018/0198220 | A1 * | 7/2018 | Sasame | H01R 12/716 |
| 2019/0173209 | A1 * | 6/2019 | Lu | H01R 12/716 |
| 2019/0214755 | A1 * | 7/2019 | Manickam | H01R 12/721 |
| 2020/0266584 | A1 * | 8/2020 | Lu | H01R 12/75 |
| 2020/0412060 | A1 * | 12/2020 | Hsieh | H01R 13/6471 |
| 2021/0036465 | A1 * | 2/2021 | Tang | H01R 12/721 |
| 2021/0336360 | A1 * | 10/2021 | Kolak | H01R 12/707 |
| 2022/0029358 | A1 | 1/2022 | Lin | |
| 2023/0026708 | A1 * | 1/2023 | Carbaugh | H01R 43/20 |
| 2023/0420888 | A1 | 12/2023 | Takai et al. | |

FOREIGN PATENT DOCUMENTS

| | | | | |
|---|---|---|---|---|
| CN | 220440049 U | | 2/2024 | |
| JP | 2020184471 A | * | 11/2020 | H01R 12/79 |
| WO | 2014113563 A1 | | 7/2014 | |

* cited by examiner

ELECTRICAL CONNECTOR FOR HIGH-SPEED TRANSMISSION

BACKGROUND

1. Technical Field

The present invention relates to a connector.

2. Description of Related Art

For example, U.S. Pat. No. 9,531,129 discloses an electrical connector having a first conductor array and a second conductor array that are vertically arranged.

In the configuration disclosed in U.S. Pat. No. 9,531,129, subarrays each consisting of G-S-S-G are arranged in repetition such as G-S-S-G-S-S-G-S-S-G.

Further, it is also disclosed that the subarrays may be arranged in repetition such as G-S-S-G-G-S-S-G-G-S-S-G (this arrangement is referred to as “double ground configuration” for convenience).

Note that “G” represents ground, and “S” represents signal.

In a case of ultrahigh-speed transmission (for example, high-speed transmission exceeding 100 Gbps using a PAM4 modulation scheme), however, there may be a problem of heat generation when the subarrays are arranged as G-S-S-G-G-S-S-G-G-S-S-G.

Accordingly, the present invention intends to provide a connector employing a double ground configuration that can easily cool generated heat.

BRIEF SUMMARY

To solve the above problem, the connector of the present invention employs the following solutions.

The connector according to the first aspect of the present invention includes: a top pin group having a plurality of contact pins aligned in a predetermined direction; and a bottom pin group having a plurality of contact pins aligned in the predetermined direction, the bottom pin group being arranged so as to face the top pin group and located on a substrate side. Each of the contact pins is at least either one of a signal pin used for signaling and a ground pin used for grounding, and the top pin group includes a double ground configuration in which sets of signal pins and ground pins are aligned adjacent to each other in the predetermined direction, each of the sets including two of the signal pins aligned between two of the ground pins.

According to the connector of the present aspect, since at least the top pin group out of the top pin group and the bottom pin group employs the double ground configuration (a configuration of G-S-S-G-G-S-S-G- . . . -G-S-S-G, where G denotes a ground, and S denotes a signal), crosstalk during high-speed transmission can be reduced in the top pin group.

Further, the top pin group employing the double ground configuration faces the bottom pin group located on the substrate side in a state where the connector is mounted on the substrate (or in a state where the connector is connected to another connector mounted on the substrate), that is, the top pin group is located above the bottom pin group above the substrate. Thus, more space becomes available on the top pin group side in the connector. Therefore, a space to install the heatsink or the like for cooling heat generated during ultrahigh-speed transmission can be ensured on the top pin group side.

Note that the “ultrahigh-speed transmission” as used herein refers to high-speed transmission exceeding 100 Gbps using a PAM4 modulation scheme, for example.

The connector according to the present aspect may be, for example, a host connector mounted on a substrate or a plug connector connected to the host connector.

The connector according to the second aspect of the present invention is used for high-speed transmission that is faster than or equal to 100 Gbps, in the connector of the first aspect.

The connector according to the third aspect of the present invention includes a conductive member electrically connected to adjacent two of the ground pins in the top pin group, in the connector of the first aspect or the second aspect.

According to the connector of the present aspect, since the connector includes the conductive member electrically connected to adjacent two ground pins in the top pin group, noise can be attenuated by the conductive member.

In the connector according to the fourth aspect of the present invention, the conductive member includes a protruding shape arranged between adjacent two of the ground pins in the top pin group, in the connector of the third aspect.

According to the connector of the present aspect, since the conductive member includes a protruding shape arranged between adjacent two ground pins in the top pin group, the area of the conductive member facing each ground pin can be increased by the protruding shape.

In the connector according to the fifth aspect of the present invention, the conductive member is electrically connected to each of the ground pins of the bottom pin group, in the connector of the third aspect or the fourth aspect.

According to the connector of the present aspect, since the conductive member is electrically connected to each of the ground pins of the bottom pin group, the conductive member is, as a single member, in contact with the ground pin of the top pin group and the ground pin of the bottom pin group. It is thus possible to reduce the number of components and thus reduce the cost compared to a case where a conductive member contacted to the ground pin of the top pin group and a conductive member contacted to the ground pin of the bottom pin group are provided as separate members. Further, the conductive member being formed of a single component can also improve mountability.

In the connector according to the sixth aspect of the present invention, each of the contact pins includes a mount portion mounted on a substrate, an erect portion erecting in substantially a vertical direction from the mount portion, and a substantially-straight portion extending in substantially a horizontal direction from the erect portion and including a contact point with a counterpart terminal, and the conductive member is electrically connected to the erect portion of each of the ground pins of the top pin group, in the connector of any one of the third aspect to the fifth aspect.

In the connector according to the seventh aspect of the present invention, the conductive member includes a dimension in a height direction that is larger than or equal to 50% of a dimension of the erect portion, in the connector of any one of the third aspect to the sixth aspect.

According to the connector of the present aspect, since the conductive member includes the dimension in the height direction that is larger than or equal to 50% of the dimension of the erect portion, the increased volume of the conductive member can improve the noise attenuation performance allowed by the conductive member.

In the connector according to the eighth aspect of the present invention, the conductive member is electrically connected to a front face of the erect portion, and the connector includes a back face member located on a back face of the erect portion of each of the ground pins of the top pin group and configured to hold the erect portion of each of the ground pins of the top pin group between the back face member and the conductive member, in the connector of any one of the third aspect to the seventh aspect.

According to the connector of the present aspect, since the connector includes the back face member that holds the erect portion of each ground pin of the top pin group between the back face member and the conductive member, it is possible to push the ground pin against the conductive member by using the back face member. This makes it possible to cause the top ground pin to be reliably contacted to the conductive member.

The connector according to the ninth aspect of the present invention includes a housing that holds the top pin group and the bottom pin group, each of the contact pins extends outward such that a portion on a tip side including a contact point with a counterpart terminal is inclined from the housing, and a first wall extending in an extending direction of each of the contact pins and separating inclined portions of each of the contact pins extending outward from the housing from each other is formed in the housing, in the connector of the first aspect.

According to the connector of the present aspect, since the first wall separating inclined portions of each of the contact pins from each other is formed in the housing, it is possible to reduce crosstalk and apply impedance adjustment by using the first wall.

In the connector according to the tenth aspect of the present invention, a second wall extending in the extending direction of each of the contact pins and facing an inner face of the inclined portion of each of the contact pins is formed, in the connector of the first aspect or the ninth aspect.

According to the connector of the present aspect, since the second wall facing an inner face of the inclined portion of each of the contact pins is formed in the housing, it is possible to apply impedance adjustment by using the second wall. Further, the first wall is provided so as to extend outward from the second wall, and thereby the root of the first wall can be reinforced by the second wall.

Note that the “inner face” as used herein means a face facing the space in which a substrate is inserted.

The connector according to the eleventh aspect of the present invention includes a housing that holds the top pin group and the bottom pin group, each of the contact pins extends outward such that a portion on a tip side including a contact point with a counterpart terminal is inclined from the housing, and an inclined portion of each of the contact pins extending outward from the housing includes a length that is larger than or equal to 2 mm from a root to the contact point, in the connector of any one of the first aspect, the ninth aspect, and the tenth aspect.

According to the connector of the present aspect, since the inclined portion of each of the contact pins extending outward from the housing includes a length that is larger than or equal to 2 mm from a base end to the contact point, it is possible to suitably cope with a change in the thickness dimension of the substrate. For example, even with a larger thickness dimension of the substrate inserted in the connector, such a change in the thickness can be absorbed by the bending displacement of the inclined portions because of the large dimension of the inclined portion.

The connector according to the twelfth aspect of the present invention includes: a top pin group having a plurality of contact pins aligned in a predetermined direction; and a bottom pin group having a plurality of contact pins aligned in the predetermined direction, the bottom pin group being arranged so as to face the top pin group and located on a substrate side. Each of the contact pins is at least either one of a signal pin used for signaling and a ground pin used for grounding, the connector includes a conductive member in contact with the ground pin, each of the contact pins includes a mount portion mounted on a substrate, an erect portion erecting in substantially vertically from the mount portion, and a substantially-straight portion extending in substantially horizontally from the erect portion and including a contact point with a counterpart terminal, and the conductive member is electrically connected to the erect portion of each of the ground pins of the top pin group and includes a dimension in a height direction that is larger than or equal to 50% of a dimension of the erect portion.

In the connector according to the thirteenth aspect of the present invention, wherein the conductive member is electrically connected to a front face of the erect portion, and the connector includes a back face member that located on a back face of the erect portion of each of the ground pins of the top pin group and configured to hold the erect portion of each of the ground pins of the top pin group between the back face member and the conductive member, in the connector of the twelfth aspect.

The connector according to the fourteenth aspect of the present invention includes: a first contact pin group having a plurality of contact pins aligned in a predetermined direction; a second contact pin group having a plurality of contact pins aligned in the predetermined direction, the second contact pin group being arranged so as to face the first contact pin group; and a housing that holds the first contact pin group and the second contact pin group, each of the contact pins extends outward such that a portion on a tip side including a contact point with a counterpart terminal is inclined from the housing, and a first wall extending in an extending direction of each of the contact pins and separating inclined portions of each of the contact pins extending outward from the housing from each other is formed in the housing.

In the connector according to the fifteenth aspect of the present invention, a second wall extending in the extending direction of each of the contact pins and facing an inner face of the inclined portion of each of the contact pins is formed in the housing, in the connector of the fourteenth aspect.

In the connector according to the sixteenth aspect of the present invention, each of the contact pins is at least either one of a signal pin used for signaling and a ground pin used for grounding, and at least either one of the first contact pin group and the second contact pin group includes a double ground configuration in which sets of signal pins and ground pins are aligned adjacent to each other in the predetermined direction, each of the sets including two of the signal pins aligned between two of the ground pins, in the connector of the fourteenth aspect or the fifteenth aspect.

The connector according to the seventeenth aspect of the present invention is used for high-speed transmission that is faster than or equal to 100 Gbps, in the connector of the sixteenth aspect.

In the connector according to the eighteenth aspect of the present invention, the inclined portion includes a length that is larger than or equal to 2 mm from a root to the contact point, in the connector of any one of the fourteenth aspect to the seventeenth aspect.

DETAILED DESCRIPTION

A connector according to one embodiment of the present disclosure will be described below with reference to FIG. 1 to FIG. 32.

The connector of the present embodiment is a device that electrically connects a module 320 and a mount substrate 310 (substrate) to each other.

Figure 1:
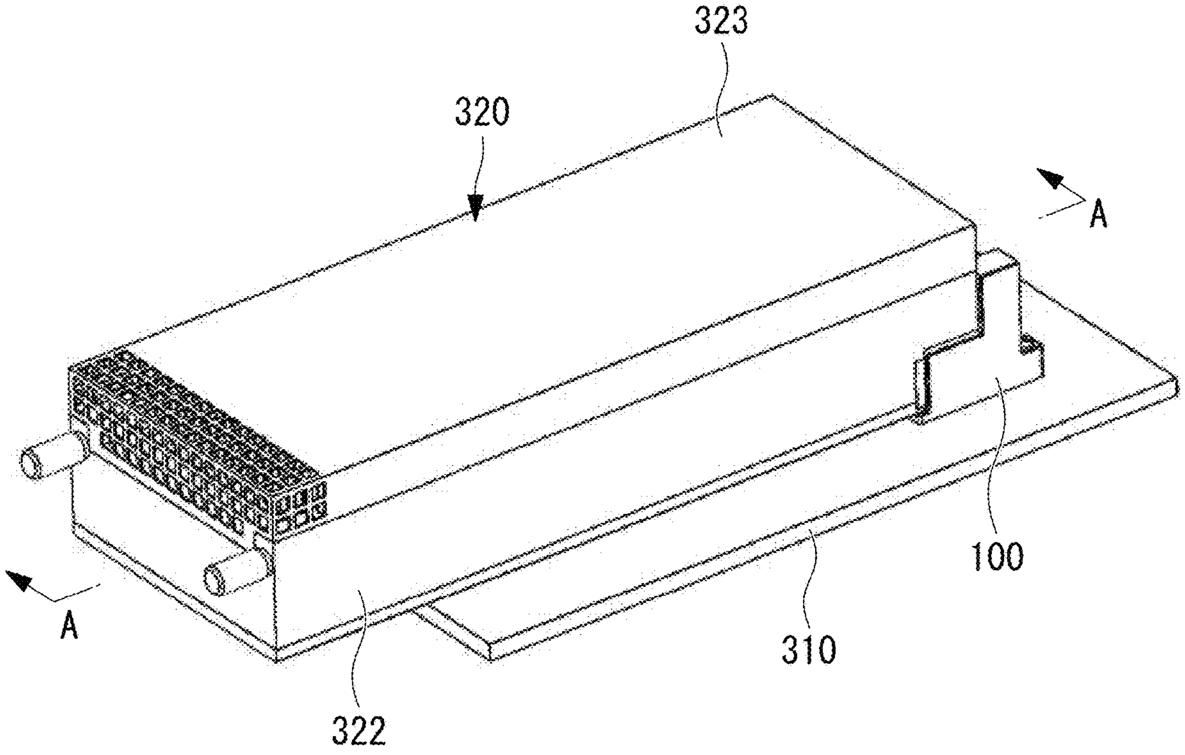
FIG. 1 is a perspective view of a module mounted on a mount substrate.
Figure 2:
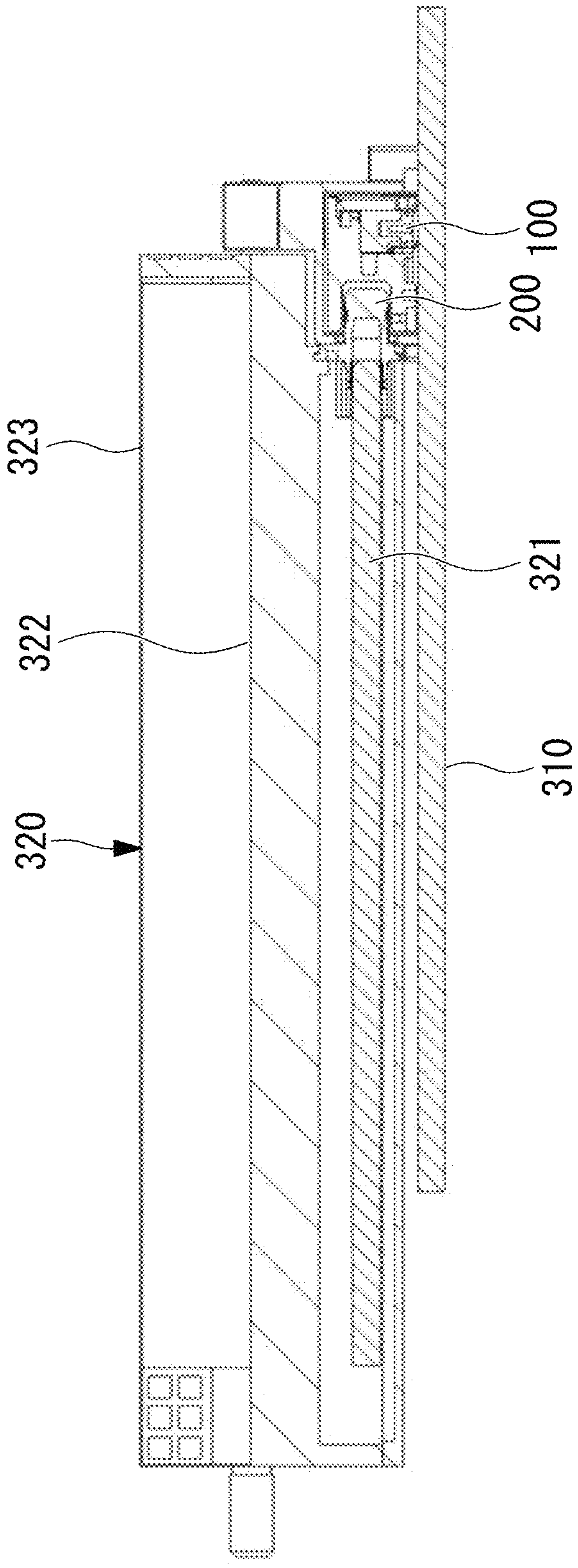
FIG. 2 is a sectional view taken along a cut line A-A illustrated in FIG. 1.

As illustrated in FIG. 1 and FIG. 2, the module 320 has a plug connector substrate 321 and a cage 322 that accommodates the plug connector substrate 321. Further, for efficient cooling, a heatsink 323 may be installed on the top face of the cage 322.

The plug connector substrate 321 is electrically connected to the mount substrate 310 via a host connector 100 mounted on the mount substrate 310 and via a plug connector 200 that connects the host connector 100 and the plug connector substrate 321 to each other.

The connector of the present embodiment corresponds to the host connector 100 and/or the plug connector 200 described above. These connectors are adapted for ultrahigh-speed transmission.

Note that the "ultrahigh-speed transmission" as used herein refers to high-speed transmission exceeding 100 Gbps using a PAM4 modulation scheme, for example.

[Host Connector]

The host connector 100 will be described below.

<Summary of Configuration of Host Connector>

The host connector 100 is a connector that is mounted on the mount substrate 310 and in which the plug connector 200 is inserted, that is, a connector for connecting the mount substrate 310 and the plug connector 200 to each other.

As illustrated in FIG. 3 to FIG. 7, the host connector 100 includes a housing 110, a top pin group 120, a bottom pin group 130, a conductive member 140, an alignment member 150, and a back plate 160 (back face member).

The housing 110 is a component having substantially a rectangular parallelepiped external shape and accommodates and holds the top pin group 120, the bottom pin group 130, the conductive member 140, and the alignment member 150.

The housing 110 is a nonconductive member and is molded from a resin or the like, for example.

Figure 5:
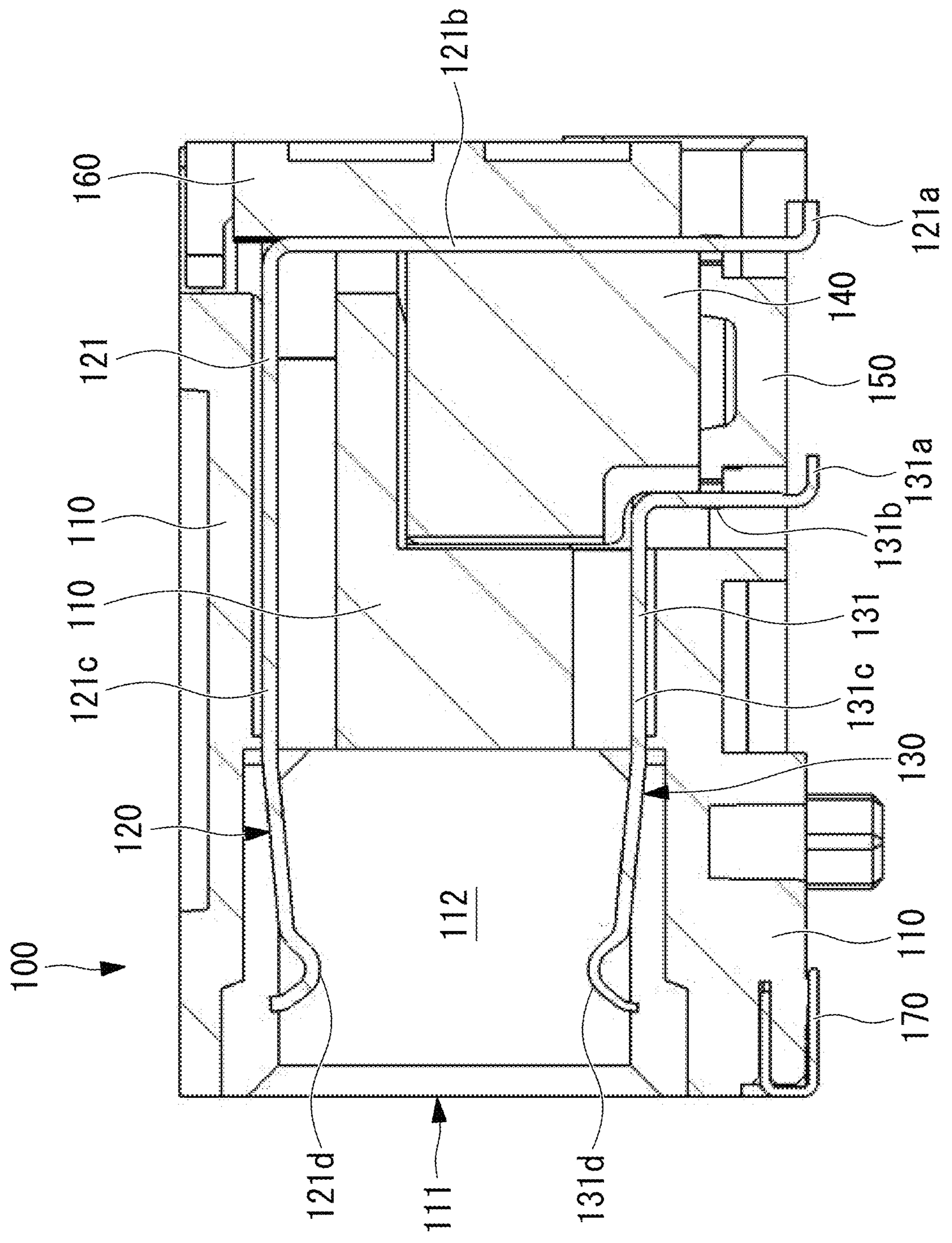
FIG. 5 is a transverse sectional view of the host connector.
Figure 6:
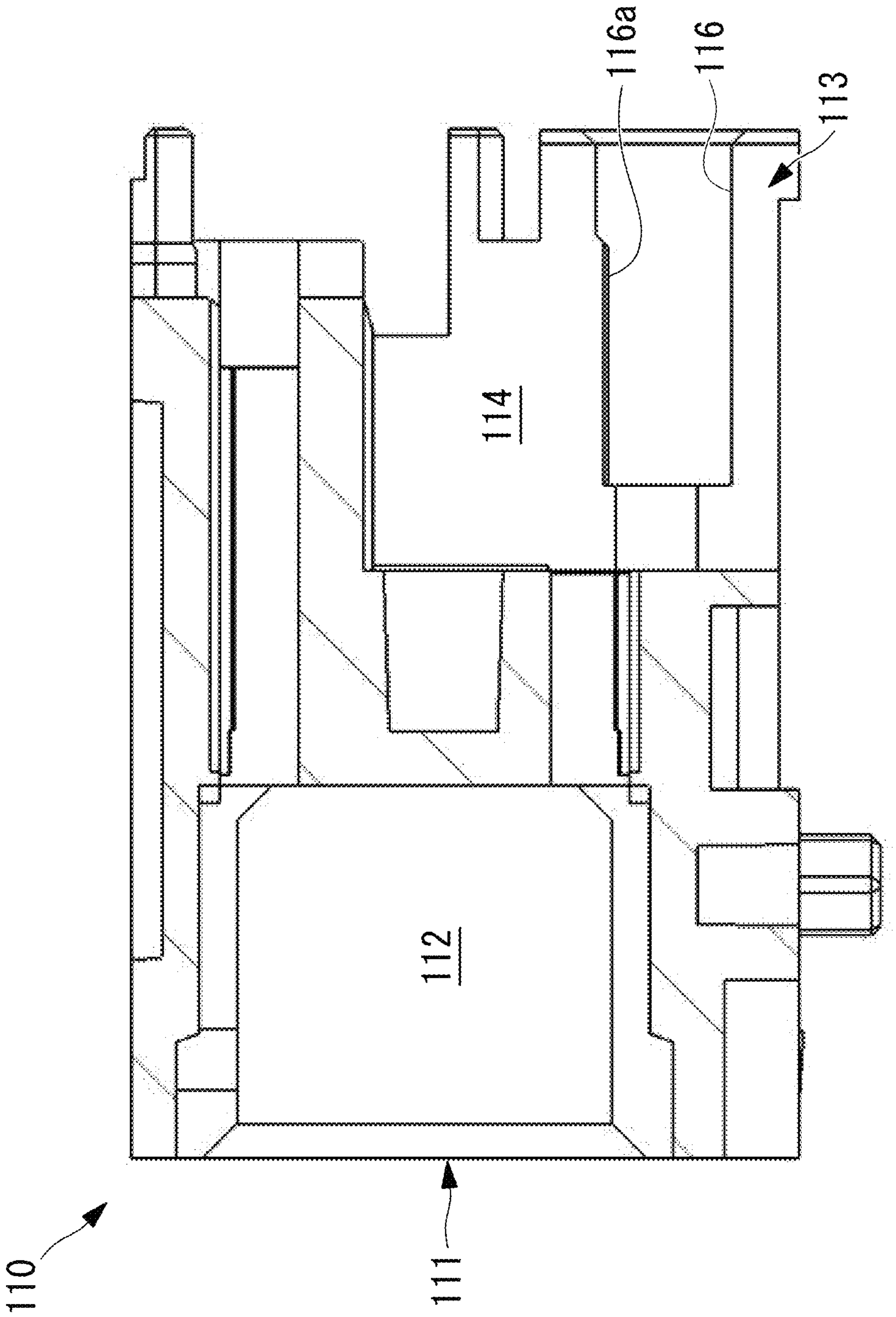
FIG. 6 is a transverse sectional view of a housing of the host connector.

As illustrated in FIG. 5 and FIG. 6, a plug insertion space 112 and a member accommodating space 114 are formed inside the housing 110.

A front opening 111 communicating with the plug insertion space 112 is opened in the front face of the housing 110.

A back opening 113 communicating with the member accommodating space 114 is provided in a part of the back face and the bottom face of the housing 110.

The plug insertion space 112 is a space in which the plug connector 200 is inserted via the front opening 111.

The member accommodating space 114 is a space in which the conductive member 140 and the alignment member 150 are accommodated.

Further, each contact pin of the top pin group 120 and the bottom pin group 130 is accommodated across the plug insertion space 112 and the member accommodating space 114.

Figure 8:
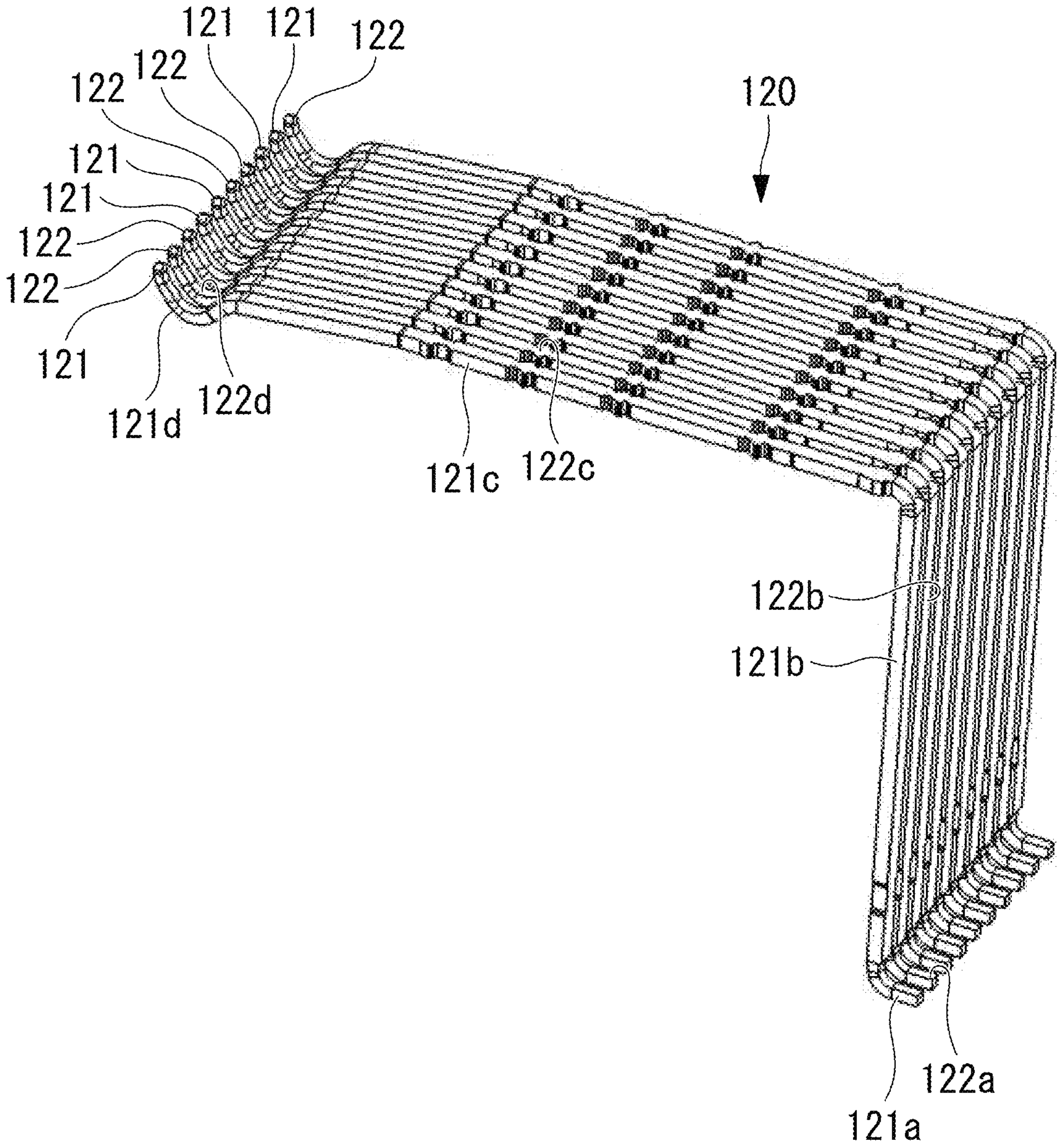
FIG. 8 is a perspective view of a part of a top pin group.

As illustrated in FIG. 8, the top pin group 120 is a group of contact pins configured such that a plurality of top ground pins 121 and a plurality of top signal pins 122 are aligned in a predetermined direction.

In the top pin group 120, the plurality of top ground pins 121 and the plurality of top signal pins 122 are aligned in accordance with a predetermined rule. The details thereof will be described later.

Figure 7:
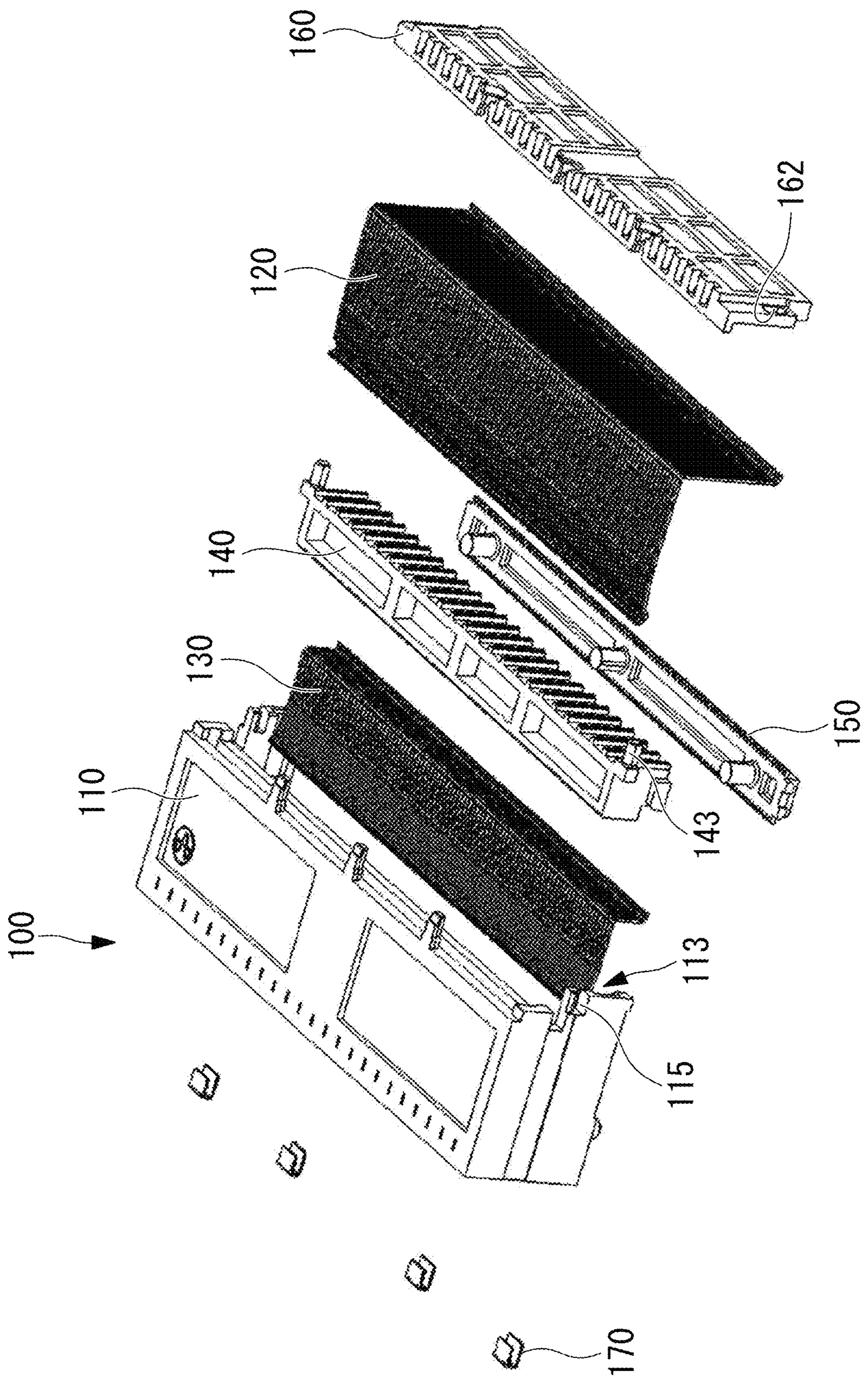
FIG. 7 is an exploded perspective view of the host connector when viewed from above back.

As illustrated in FIG. 7, the alignment direction of these contact pins of the top pin group 120 matches the longitudinal direction of the housing 110.

Each top ground pin 121 is an elongated metal terminal for electrical conduction and has a mount portion 121*a*, an erect portion 121*b*, and a substantially-straight portion 121*c*.

The mount portion 121*a* is a portion mounted on the mount substrate 310 and extends in the horizontal direction on the base end side of the top ground pins 121.

The erect portion 121*b* is a portion erecting from the mount portion 121*a* at substantially a right angle (in substantially the vertical direction in FIG. 8). The longitudinal dimension of the erect portion 121*b* is sufficiently larger than the longitudinal dimension of the mount portions 121*a*.

The substantially-straight portion 121*c* is a portion extending from the erect portion 121*b* at substantially a right angle (in substantially the horizontal direction in FIG. 8).

The longitudinal dimension of the substantially-straight portion 121*c* is sufficiently larger than the longitudinal dimension of the mount portion 121*a*. Further, the longitudinal dimension of the substantially-straight portion 121*c* is preferably larger than the longitudinal dimension of the erect portion 121*b*.

A contact point part 121*d* bent convex toward the plug insertion space 112 (see FIG. 5) is formed on the tip side of the substantially-straight portion 121*c*. The contact point part 121*d* serves as a contact point with a top ground pin 221 of the plug connector 200 described later. As illustrated in FIG. 5, a part of the substantially-straight portion 121*c* including the contact point part 121*d* extends outward to the plug insertion space 112.

Each top signal pin 122 is an elongated metal terminal for electrical conduction and has a mount portion 122*a*, an erect portion 122*b*, and a substantially-straight portion 122*c*.

The configurations of the mount portion 122*a*, the erect portion 122*b*, and the substantially-straight portion 122*c* are the same as the configurations of the mount portion 121*a*, the erect portion 121*b*, and the substantially-straight portion 121*c* of the top ground pin 121.

Note that the contact point part 122*d* formed to the substantially-straight portion 122*c* serves as a contact point with a top signal pin 222 of the plug connector 200 described later.

Figure 9:
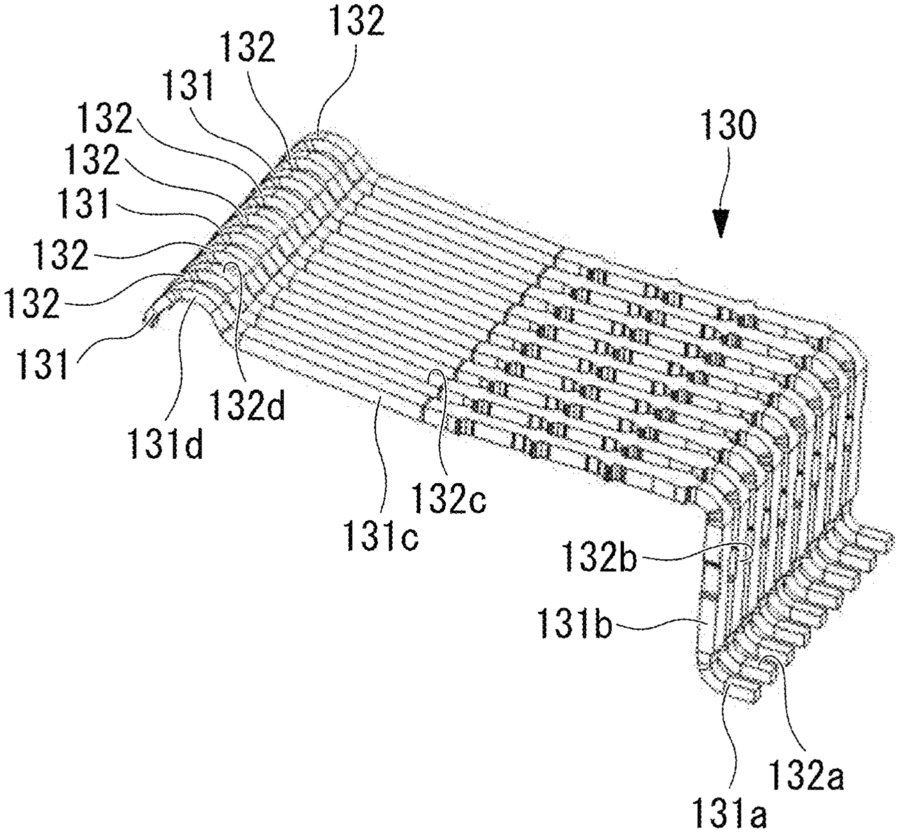
FIG. 9 is a perspective view of a part of a bottom pin group.

As illustrated in FIG. 9, the bottom pin group 130 is a group of contact pins configured such that a plurality of bottom ground pins 131 and a plurality of bottom signal pins 132 are aligned in the predetermined direction.

In the bottom pin group 130, the plurality of bottom ground pins 131 and the plurality of bottom signal pins 132 are aligned. The details thereof will be described later.

As illustrated in FIG. 7, the alignment direction of these contact pins of the bottom pin group 130 matches the longitudinal direction of the housing 110.

Each bottom ground pin 131 is an elongated metal terminal for electrical conduction and has a mount portion 131*a*, an erect portion 131*b*, and a substantially-straight portion 131*c*.

The mount portion 131*a* is a portion mounted on the mount substrate 310 and extends in the horizontal direction on the base end side of the bottom ground pins 131.

The erect portion 131*b* is a portion erecting from the mount portion 131*a* at substantially a right angle (in substantially the vertical direction in FIG. 9). The longitudinal dimension of the erect portion 131*b* is larger than the longitudinal dimension of the mount portions 131*a*.

The substantially-straight portion 131*c* is a portion extending from the erect portion 131*b* at substantially a right angle (in substantially the horizontal direction in FIG. 9).

The longitudinal dimension of the substantially-straight portion 131*c* is sufficiently larger than the longitudinal dimension of the mount portion 131*a*. Further, the longitudinal dimension of the substantially-straight portion 131*c* is larger than the longitudinal dimension of the erect portion 131*b*.

A contact point part 131*d* bent convex toward the plug insertion space 112 (see FIG. 5) is formed on the tip side of the substantially-straight portion 131*c*. The contact point part 131*d* serves as a contact point with a bottom ground pin 231 of the plug connector 200 described later. As illustrated in FIG. 5, a part of the substantially-straight portion 131*c* including the contact point part 131*d* extends outward to the plug insertion space 112.

Each bottom signal pin 132 is an elongated metal terminal for electrical conduction and has a mount portion 132*a*, an erect portion 132*b*, and a substantially-straight portion 132*c*.

The configurations of the mount portion 132*a*, the erect portion 132*b*, and the substantially-straight portion 132*c* are the same as the configurations of the mount portion 131*a*, the erect portion 131*b*, and the substantially-straight portion 131*c* of the bottom ground pin 131.

Note that the contact point part 132*d* formed to the substantially-straight portion 132*c* serves as a contact point with a bottom signal pin 232 of the plug connector 200 described later.

Figure 3:
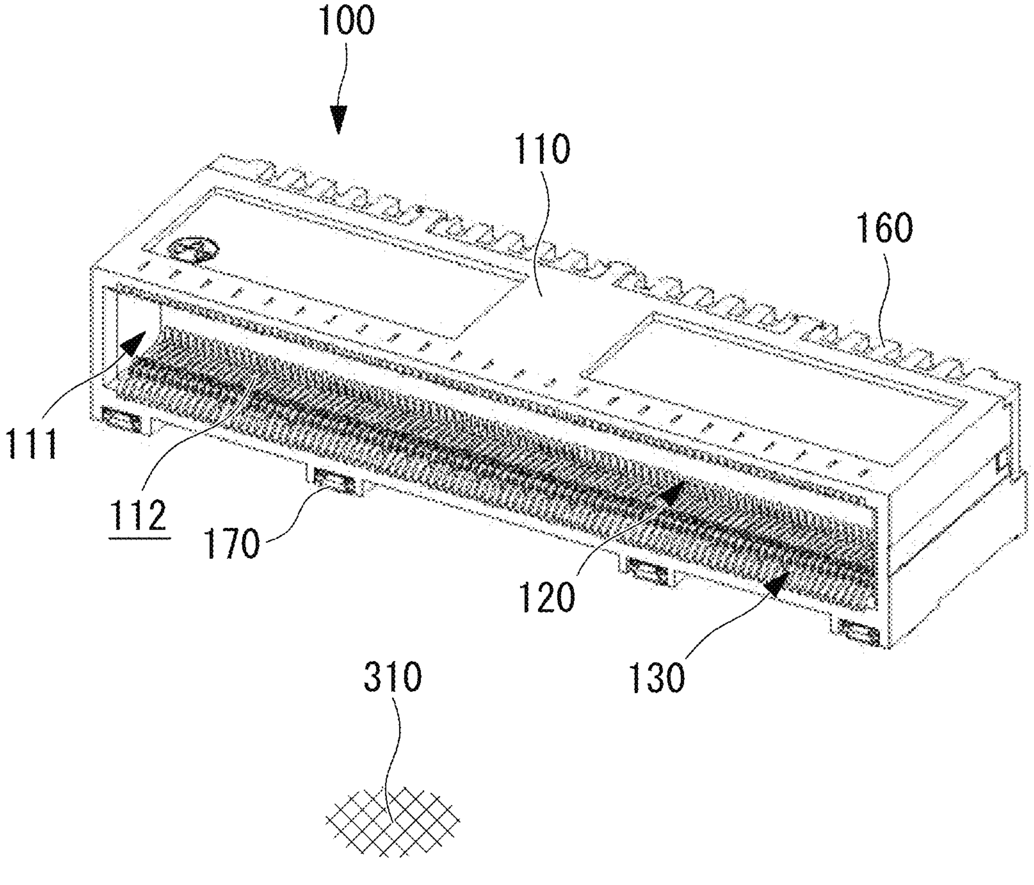
FIG. 3 is a perspective view of a host connector when viewed from above front.

In a state where the top pin group 120 and the bottom pin group 130 are assembled to the housing 110 and a state where the host connector 100 is mounted on the mount substrate 310, the top pin group 120 (in detail, the substantially-straight portion 121*c* and the substantially-straight portion 122*c*) is arranged so as to be located above the bottom pin group 130 (in detail, the substantially-straight portion 131*c* and the substantially-straight portion 132*c*) and face the bottom pin group 130 inside the housing 110, as illustrated in FIG. 3 and FIG. 5.

In other words, the bottom pin group 130 is arranged so as to be located below the top pin group 120 inside the housing 110 and face the top pin group 120. That is, the bottom pin group 130 is arranged at a closer position to the mount substrate 310 than the top pin group 120 (arranged at a position on the mount substrate 310 side) in a state where the host connector 100 is mounted on the mount substrate 310.

As illustrated in FIG. 5 to FIG. 7 and FIG. 10, the conductive member 140 is substantially a rectangular parallelepiped block-like component.

As illustrated in FIG. 5, the conductive member 140 is accommodated in the member accommodating space 114 inside the housing 110 in a state where the alignment member 150 is attached to the bottom face.

The conductive member 140 is a member having predetermined conductivity and is molded from a resin in which conductive particles are dispersed, an antistatic resin, or the like, for example. For example, the "predetermined conductivity" as used herein is greater than or equal to 10 S/m and less than or equal to 200 S/m and, preferably, greater than or equal to 30 S/m and less than or equal to 150 S/m.

As illustrated in FIG. 5 to FIG. 7 and FIG. 11, the alignment member 150 is substantially a rectangular plate-like component.

As illustrated in FIG. 5, the alignment member 150 is accommodated in the member accommodating space 114 inside the housing 110 when attached to the bottom face of the conductive member 140.

The alignment member 150 is a nonconductive member and is molded from a resin or the like, for example.

Figure 11:
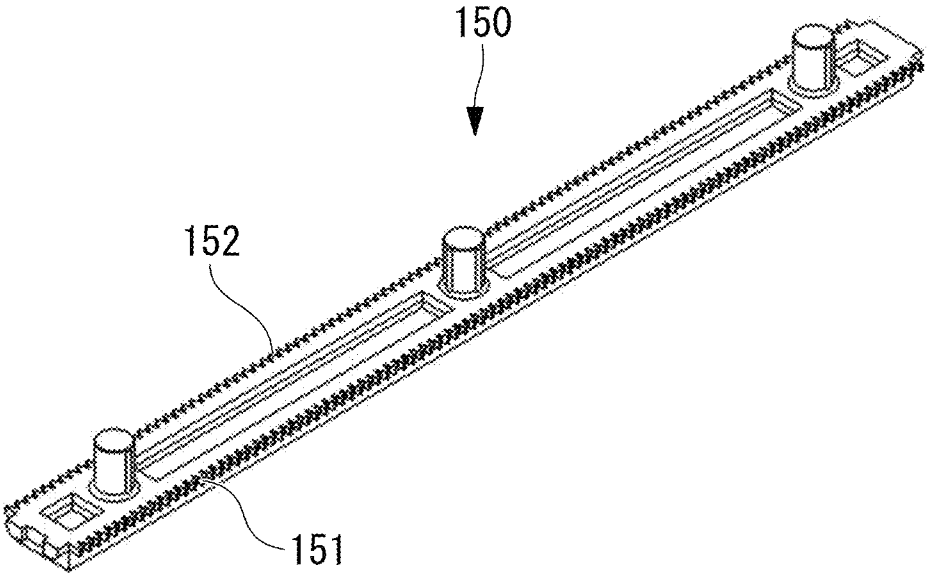
FIG. 11 is a perspective view of an alignment member when viewed from above back.
Figure 12:
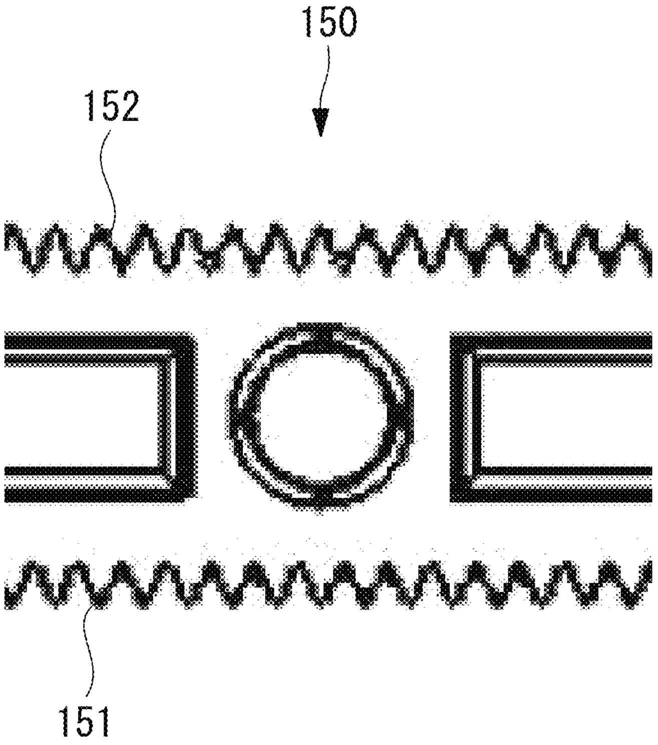
FIG. 12 is an enlarged plan view of a part of the alignment member.

As illustrated in FIG. 11 and FIG. 12, a plurality of back side alignment grooves 151 and a plurality of front side alignment grooves 152 are formed on each edge along the longitudinal direction of the alignment member 150.

Each contact pin forming the top pin group 120 is secured in each back side alignment groove 151, and thereby respective contact pins are aligned at equal pitches.

Each contact pin forming the bottom pin group 130 is secured in each front side alignment groove 152, and thereby respective contact pins are aligned at equal pitches.

As illustrated in FIG. 3 to FIG. 5 and FIG. 7, the back plate 160 is a block-like component having substantially a rectangular parallelepiped external shape.

As illustrated in FIG. 5, the back plate 160 is attached to the back face of the housing 110 so as to close a part of the back opening 113 of the housing 110.

The back plate 160 is molded from a resin or the like, for example. The back plate 160 may be a conductive member or may be a nonconductive member.

Figure 4:
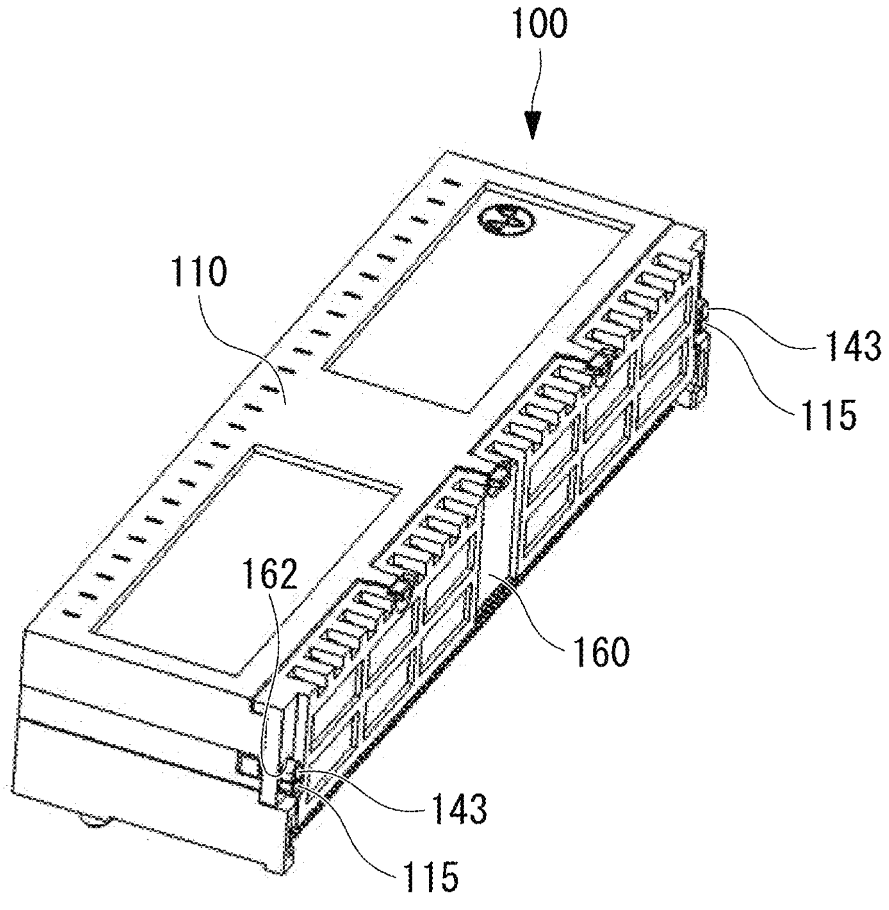
FIG. 4 is a perspective view of the host connector when viewed from above back.

As illustrated in FIG. 3 and FIG. 4, the housing 110, the top pin group 120, the bottom pin group 130, the conductive member 140, the alignment member 150, and the back plate 160 configured as described above are assembled, and thereby the host connector 100 is formed.

Figure 13:
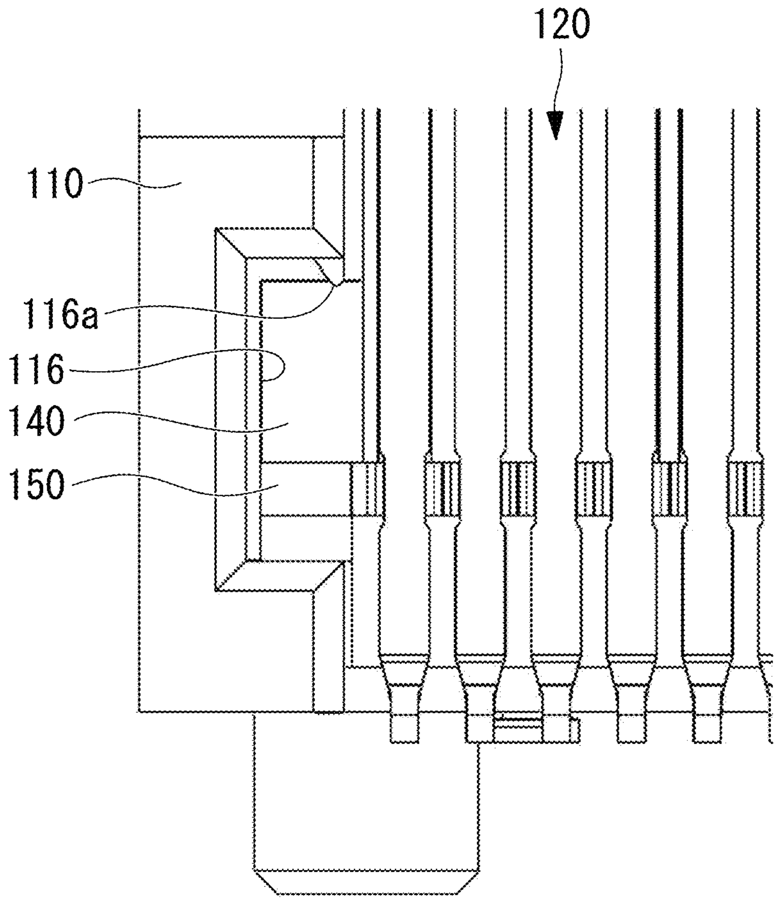
FIG. 13 is an enlarged back view near a press-fit groove of the host connector from which a back plate has been removed.
Figure 14:
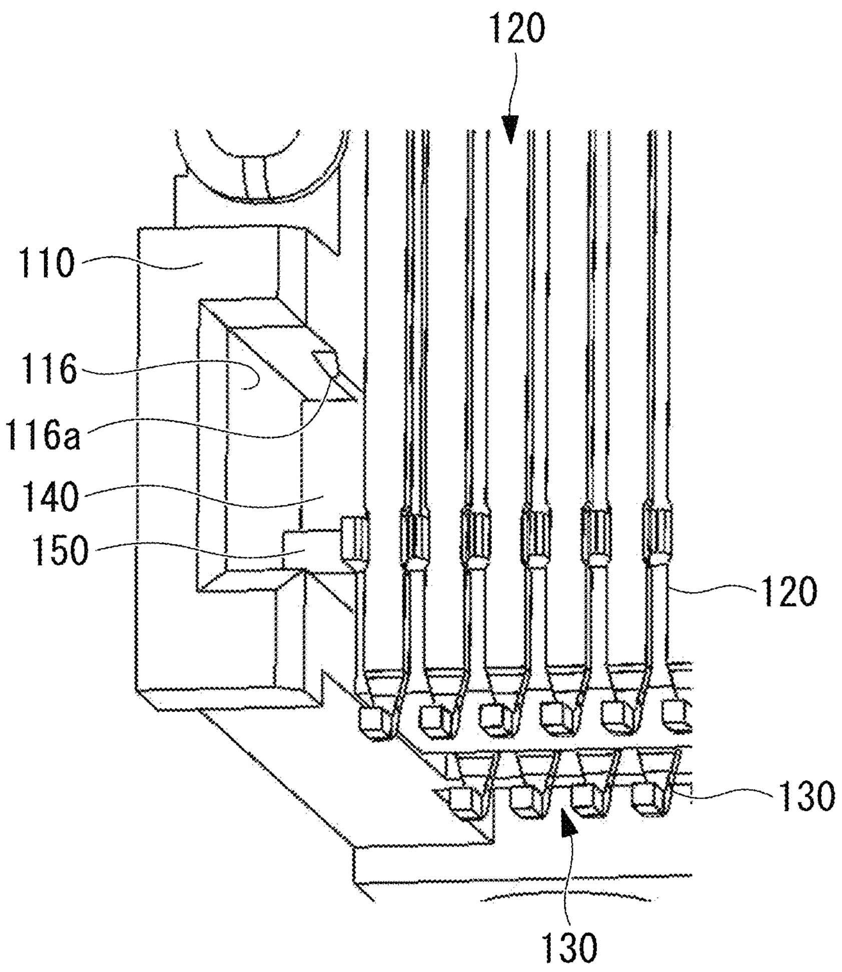
FIG. 14 is an enlarged perspective view near the press-fit groove of the host connector from which the back plate has been removed.
Figure 15:
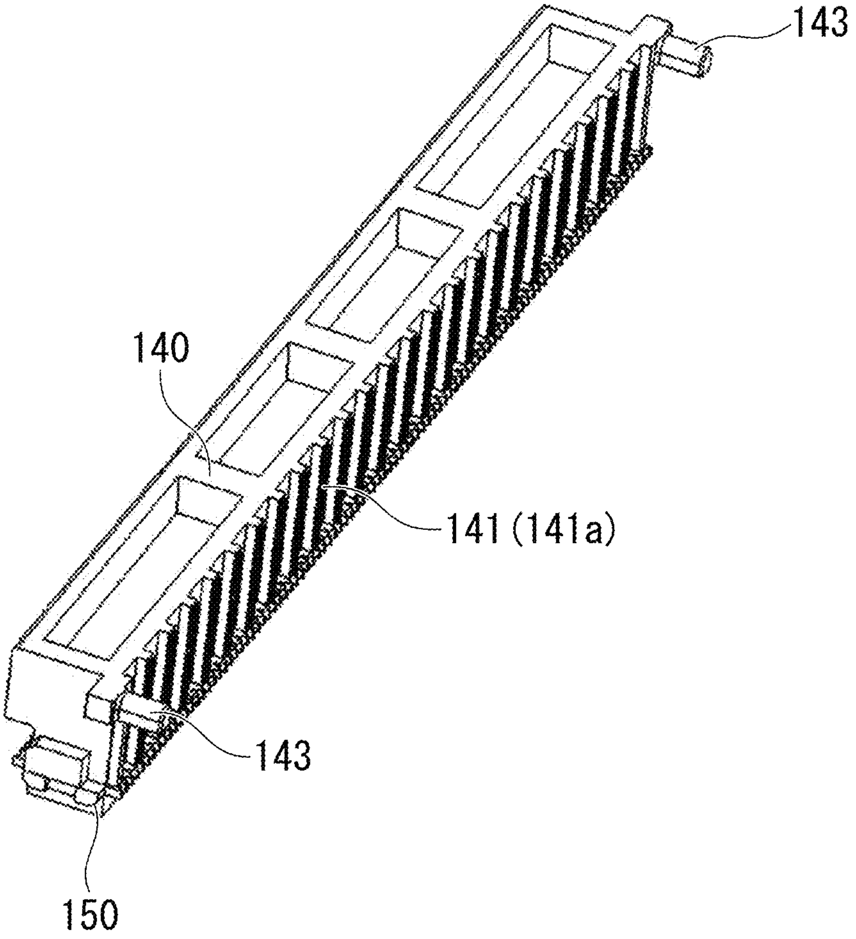
FIG. 15 is a perspective view of an assembly of the conductive member and the alignment member when viewed from above back.

In this state, as illustrated in FIG. 13 and FIG. 14, an assembly of the conductive member 140 and the alignment member 150 (see FIG. 15) is fixed to the housing 110 when both ends thereof are press-fitted into the press-fit groove 116 formed in both inner faces of the housing 110.

Specifically, a crush rib 116*a* formed on the top face of the press-fit groove 116 is crushed by the conductive member 140, and thereby both ends of the assembly are press-fitted into the press-fit groove 116.

Further, as illustrated in FIG. 5, the bottom pin group 130 is positioned by the alignment member 150 fixed to the housing 110 and, in this state, fixed to the housing 110.

Further, as illustrated in FIG. 4 and FIG. 7, substantially semicircular protrusions 115 (convex downward) are formed at both ends of the housing 110. Further, substantially semicircular protrusions 143 (convex upward) are formed at both ends of the conductive member 140.

Figure 16:
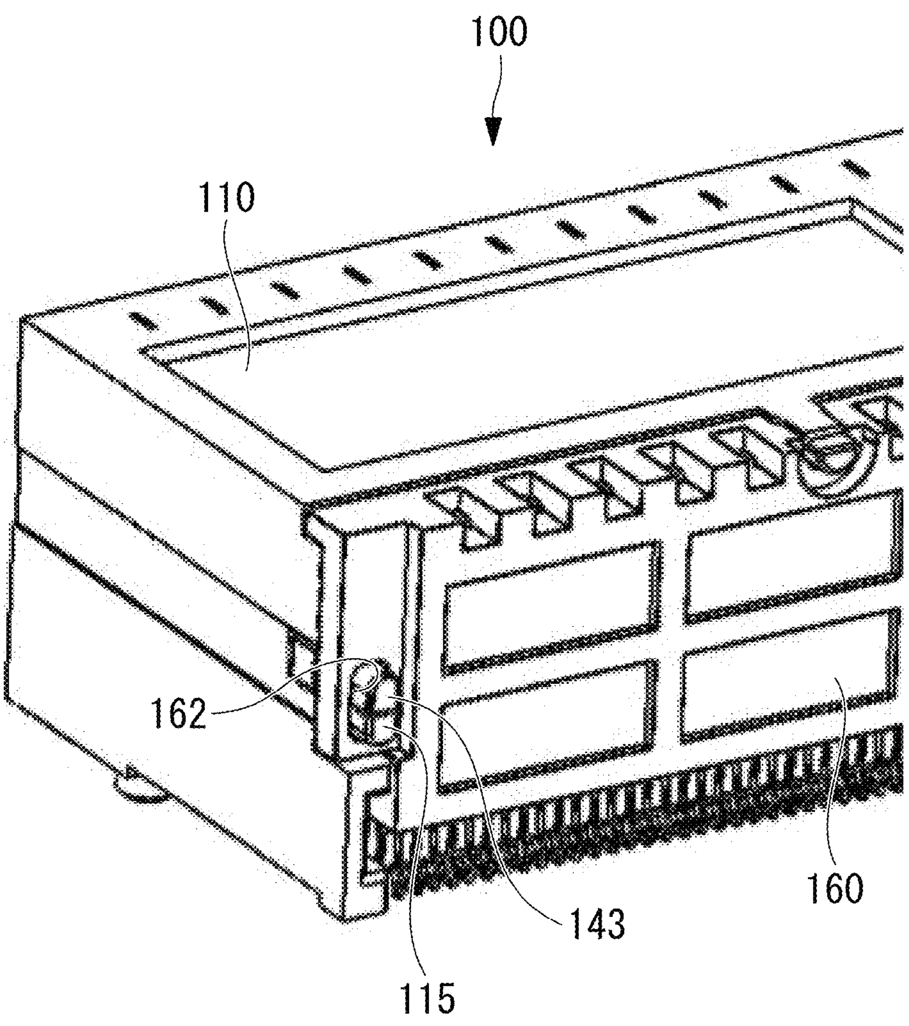
FIG. 16 is a perspective view of the back face of one end of the host connector (before the back plate is fused).

Further, as illustrated in FIG. 16, when the assembly of the conductive member 140 and the alignment member 150 is accommodated in the housing 110, each protrusion 115 and each protrusion 143 are matched to each other, and thereby a single shaft-like part is formed at each end.

Figure 17:
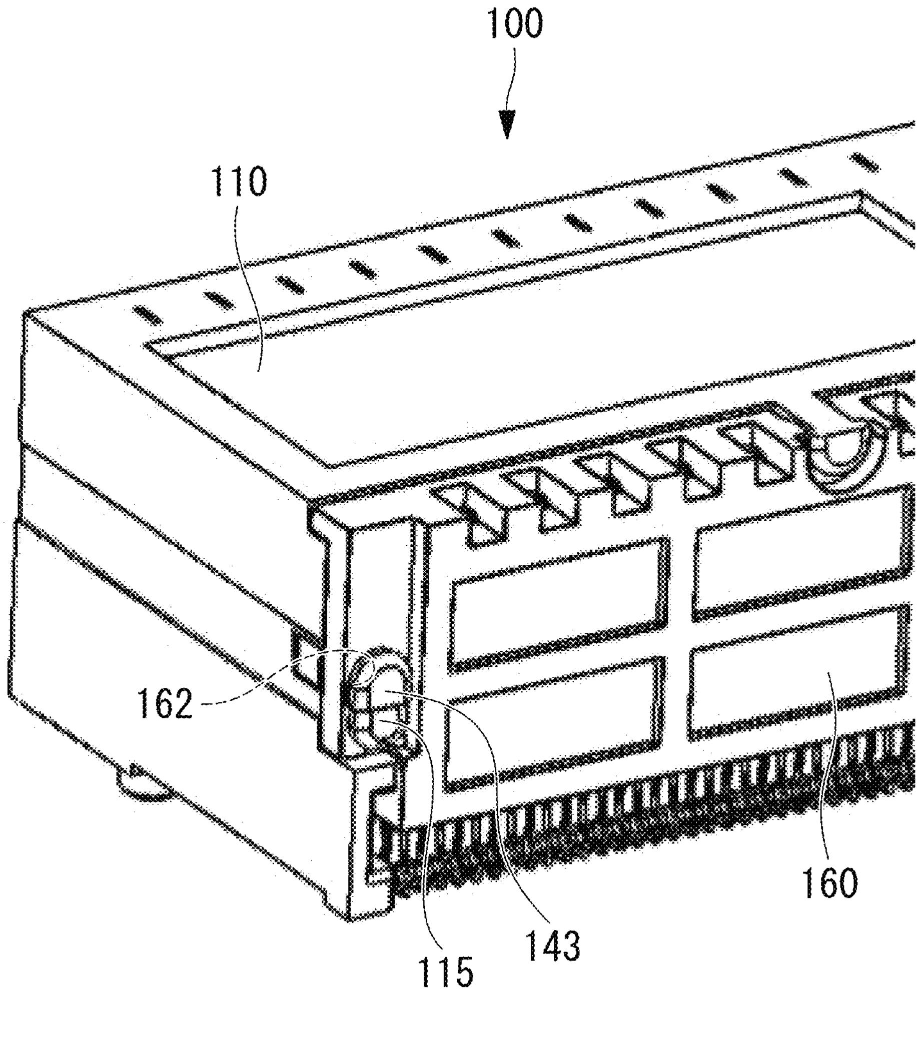
FIG. 17 is a perspective view of the back face of one end of the host connector (after the back plate has been fused).

Further, as illustrated in FIG. 17, the tip of each shaft-like part is fused to the back plate 160 in a state where each shaft-like part is inserted in a fixing hole 162 formed at both ends of the back plate 160, and thereby the back plate 160 is fixed to the back face of the housing 110.

Further, as illustrated in FIG. 5, the top pin group 120 is positioned by the alignment member 150 fixed to the housing 110 and, in this state, fixed to the housing 110.

In the host connector 100 configured as described above, as illustrated in FIG. 3, a fixing bracket 170 attached to the housing 110 and the contact pins are soldered to the mount substrate 310.

The fixing bracket 170 is soldered to the mount substrate 310, and thereby the host connector 100 can be rigidly fixed to the mount substrate 310. Further, the contact pins are soldered to the mount substrate 310, and thereby the host connector 100 can be fixed to the mount substrate 310, and these contact pins can be electrically connected to the mount substrate 310.

<Details of Alignment of Contact Pins and Arrangement of Pin Groups>

As illustrated in FIG. 8, in the top pin group 120, when the top ground pin 121 is denoted as "G", and the top signal pin 122 is denoted as "S", the contact pins are aligned as G-S-S-G-G-S-S-G- . . . -G-S-S-G. That is, a plurality of sets of G-S-S-G in which two top signal pins 122 forming a differential pair are aligned between two top ground pins 121 are aligned in the predetermined direction. In this state, the top ground pin 121 located at the end (for example, the right end) of the first set and the top ground pin 121 located at the end (for example, the left end) of the second set are adjacent to each other.

In the present embodiment, such alignment is referred to as "double ground configuration". By employing the double ground configuration, it is possible to reduce crosstalk during ultrahigh-speed transmission.

As illustrated in FIG. 9, in the bottom pin group 130, the bottom pin group 130 has a portion aligned as G-S-S-G-S-S-G- . . . -S-S-G, for example.

As described above, when the top pin group 120 (in detail, the substantially-straight portion 121*c* and the substantially-straight portion 122*c*) is arranged above the bottom pin group 130 (in detail, the substantially-straight portion 131*c* and the substantially-straight portion 132*c*) inside the housing 110, more space becomes available above the top pin group 120, as illustrated in FIG. 1 and FIG. 2.

In contrast, no more space becomes available on the bottom pin group 130 side because of the presence of the mount substrate 310.

Since high-speed signals are arranged in the top pin group 120 to which the double ground configuration is employed, the top pin group 120 is more likely to generate heat during ultrahigh-speed transmission than the bottom pin group 130. However, with arrangement of the top pin group 120 located above the bottom pin group 130, the heatsink 323 for cooling the top pin group 120 can be arranged in the space ensured by this arrangement.

In other words, the top pin group 120, which is likely to generate heat, is positively arranged above the housing 110 where an enough space is available and easy installation of the heatsink 323 or the like is possible.

Note that the double ground configuration may be employed to only the top pin group 120 or may be employed to the top pin group 120 and the bottom pin group 130.

<Details of Conductive Member>

Figure 18:
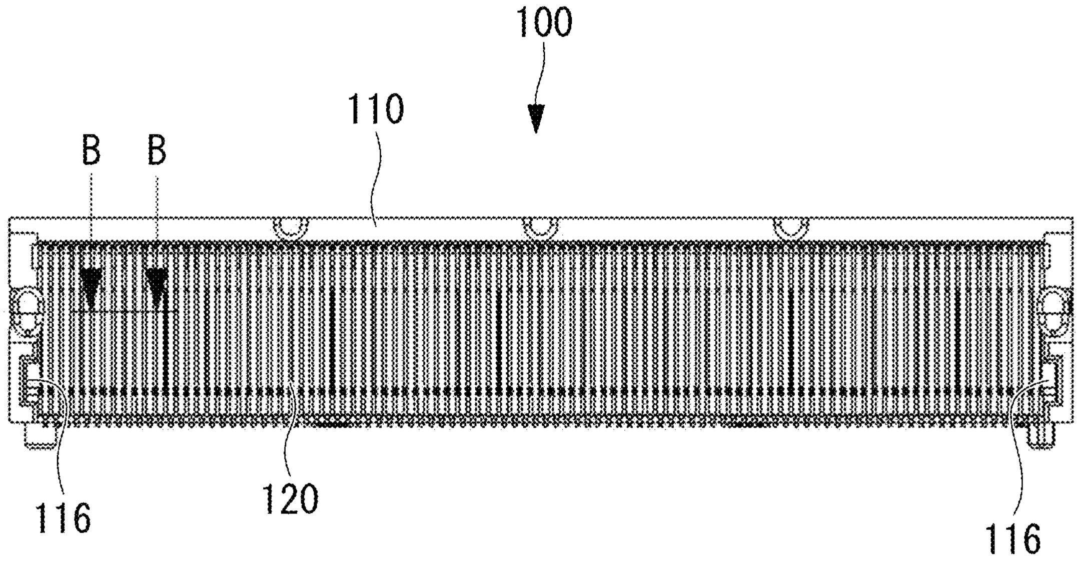
FIG. 18 is a back view of the host connector from which the back plate has been removed.

FIG. 18 illustrates a back view of the host connector 100 from which the back plate 160 has been removed. Further, FIG. 19 illustrates a sectional view taken along the cut line B-B illustrated in FIG. 18.

Figure 10:
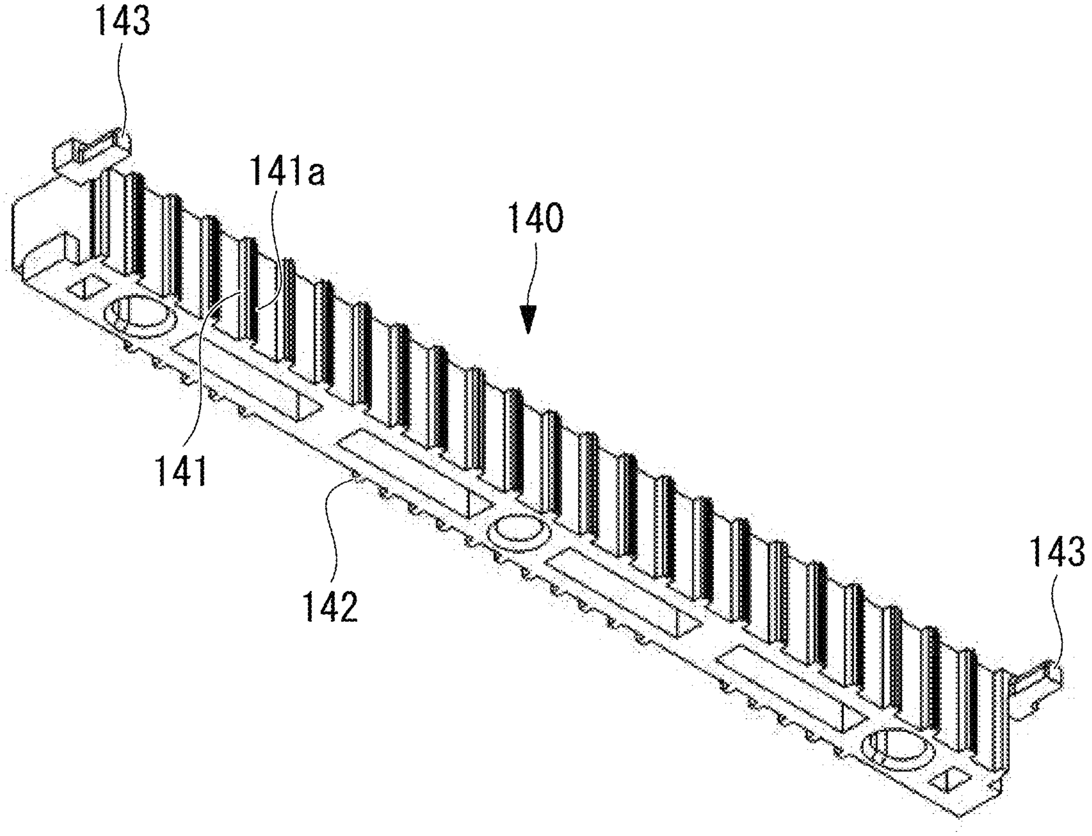
FIG. 10 is a perspective view of a conductive member when viewed from bottom back.
Figure 19:
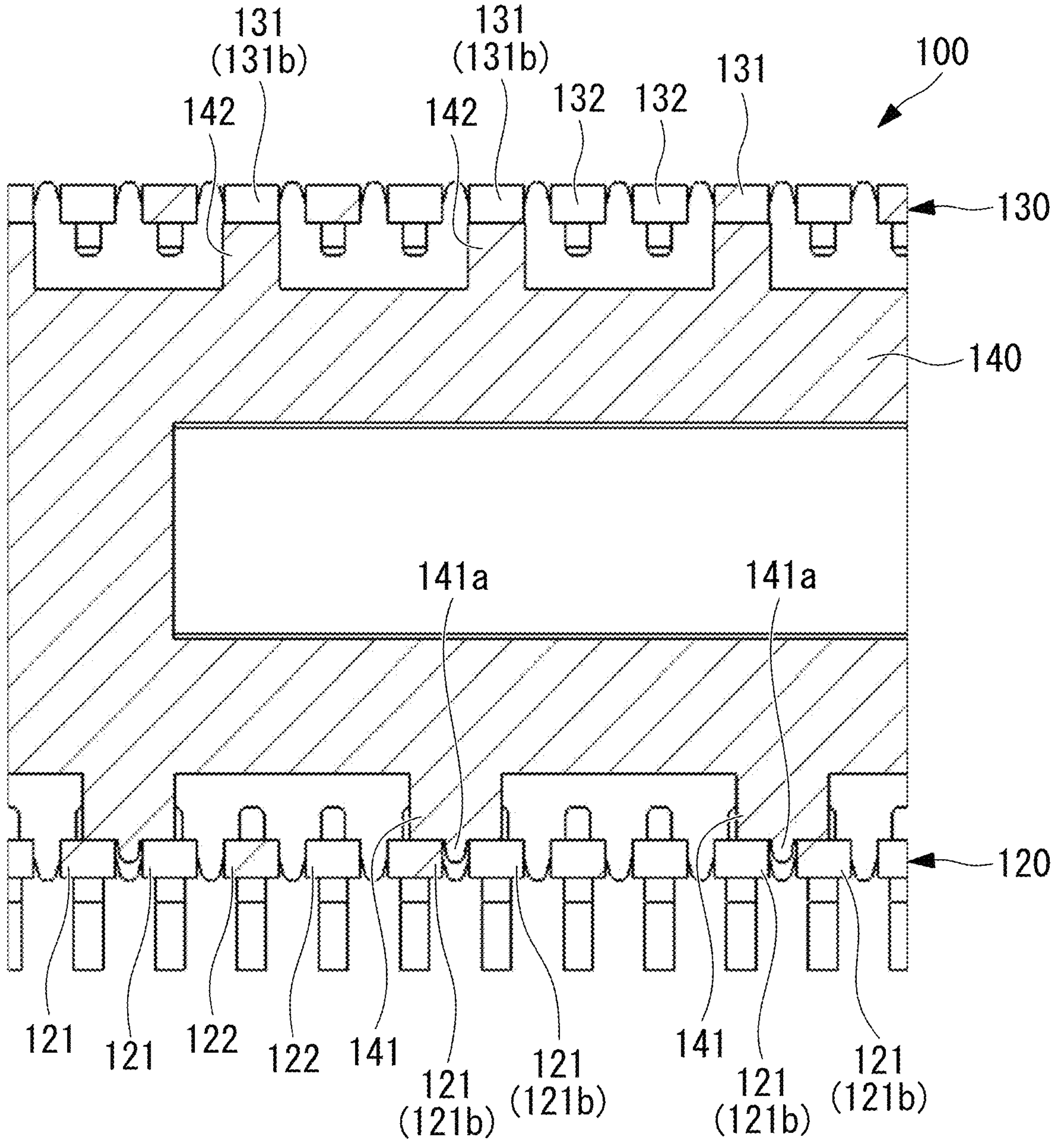
FIG. 19 is a sectional view taken along a cut line B-B illustrated in FIG. 18.

As illustrated in FIG. 10 and FIG. 19, a plurality of back side contact convex parts 141 are formed on the back face of the conductive member 140.

Each back side contact convex part 141 is a protruding part extending in the height direction (thickness direction) of the conductive member 140 and is formed at equal pitches over the longitudinal direction of the conductive member 140.

As illustrated in FIG. 5 and FIG. 19, the back side contact convex part 141 is electrically connected to the front faces of the erect portions 121*b* of adjacent two top ground pins 121 in the top pin group 120. Accordingly, since the top ground pins 121 are electrically connected to the conductive member 140 having conductivity, noise can be attenuated.

Herein, the back side contact convex part 141 may be in physical contact with the top ground pins 121, or a slight clearance may be provided between the back side contact convex part 141 and the top ground pins 121. The "slight clearance" as used herein is a clearance of a spacing having a distance between which a high frequency field of 1 GHz or higher can be electrically connected and, for example, ranges from 0.05 mm to 0.1 mm. Note that the back side contact convex part 141 is neither in physical contact nor electrical contact with the top signal pins 122.

A ridge 141*a* (protruding shape) is formed on the surface of each back side contact convex part 141.

The ridge 141*a* is an elongated protrusion extending in the height direction (thickness direction) of the conductive member 140, and a single ridge 141*a* is formed in the center area of each back side contact convex part 141.

The ridge 141*a* protrudes toward a region between the top ground pin 121 and the top ground pin 121, and this increases the area of the conductive member 140 in which the ridge 141*a* is arranged between the top ground pin 121 and the top ground pin 121 and faces these top ground pins 121.

As illustrated in FIG. 10 and FIG. 19, a plurality of front side contact convex parts 142 are formed on the front face of the conductive member 140.

Each front side contact convex part 142 is a protruding part extending in the height direction (thickness direction) of the conductive member 140 and is formed over the longitudinal direction of the conductive member 140.

As illustrated in FIG. 5 and FIG. 19, the front side contact convex part 142 is electrically connected to the back faces of the erect portions 131*b* of the bottom ground pins 131 in the bottom pin group 130. Accordingly, since the bottom ground pins 131 are electrically connected to the conductive member 140 having conductivity, noise can be attenuated.

Herein, the front side contact convex part 142 may be in physical contact with the bottom ground pin 131, or a slight clearance may be provided between the front side contact convex part 142 and the bottom ground pin 131. The "slight clearance" as used herein is a clearance of a spacing having a distance between which a high frequency field of 1 GHz or higher can be electrically connected and, for example, ranges from 0.05 mm to 0.1 mm.

Note that the front side contact convex part 142 is neither in physical contact nor electrical contact with the bottom signal pins 132.

Further, when the bottom pin group 130 employs the double ground configuration, the front side contact convex part 142 may have the same form as the back side contact convex part 141 (including the ridge 141*a*).

As illustrated in FIG. 5, the dimension in the height direction of the conductive member 140 is greater than or equal to 50% of the dimension of the erect portion 121*b* of the top ground pin 121.

Thus, the back side contact convex part 141 (including the ridge 141*a*) is in contact with a range of 50% or greater of the erect portion 121*b* of the top ground pin 121.

Further, to realize this, the conductive member 140 is required to be larger in the height direction, and such a case necessarily results in a larger ratio that the conductive member 140 occupies the member accommodating space 114 inside the housing 110.

This can improve noise attenuation performance allowed by the conductive member 140.

Note that it is preferable that the conductive member 140 occupy 50% to 90% of the member accommodating space 114.

<Details of Back Plate>

Figure 20:
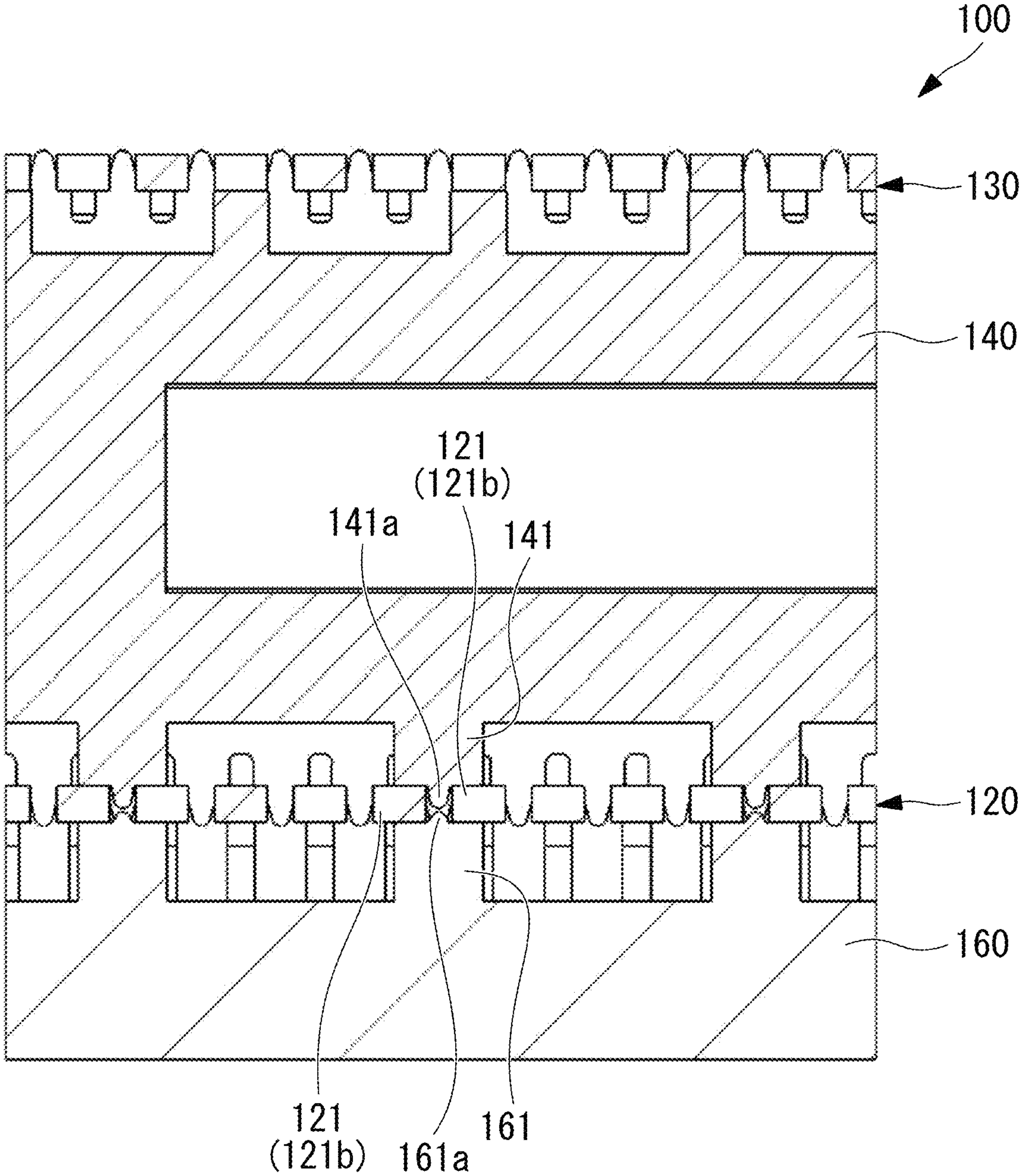
FIG. 20 is a sectional view in a state where the back plate is attached to the host connector illustrated in FIG. 19.

FIG. 20 illustrates a state where the back plate 160 is attached to the host connector 100 illustrated in FIG. 19.

As illustrated in FIG. 20, a plurality of contact convex parts 161 are formed on the front face of the back plate 160.

Each contact convex part 161 is a protruding part extending in the height direction (thickness direction) of the back plate 160 and is formed at equal pitches over the longitudinal direction of the back plate 160.

As illustrated in FIG. 5 and FIG. 20, the contact convex part 161 is located on the back faces of the erect portions 121*b* of adjacent two top ground pins 121 in the top pin group 120. In this state, it is preferable that the contact convex part 161 be in contact with each back face of two erect portions 121*b*.

As illustrated in FIG. 20, since the position of the contact convex part 161 corresponds to the position of the back side contact convex part 141, the top ground pin 121 can be held between the contact convex part 161 and the back side contact convex part 141. Accordingly, when the contact convex part 161 is in contact with the back face of the erect portion 121*b* of the top ground pin 121, the top ground pin 121 can be pushed against the back side contact convex part 141 to improve the contact property.

Further, since the conductive member 140 is pressed to the bottom ground pin 131 side by the pressing force applied to the top ground pin 121 from the back plate 160, as a result, the front side contact convex part 142 can be pushed against the bottom ground pin 131 to improve the contact property.

A ridge 161*a* is formed on the surface of each contact convex part 161.

The ridge 161*a* is an elongated protrusion extending in the height direction (thickness direction) of the back plate 160, and a single ridge 161*a* is formed in the center area of each contact convex part 161.

The ridge 161*a* protrudes toward a region between the top ground pin 121 and the top ground pin 121, and this increases the area of the back plate 160 in which the ridge 161*a* is arranged between the top ground pin 121 and the top ground pin 121 and faces these top ground pins 121.

[Plug Connector]

The plug connector 200 will be described below.

<Summary of Configuration of Plug Connector>

The plug connector 200 is a connector that is inserted in the host connector 100 and in which the plug connector substrate 321 is inserted, that is, a connector for connecting the host connector 100 and the plug connector substrate 321 to each other.

As illustrated in FIG. 21 to FIG. 24, the plug connector 200 includes a housing 210, a first contact pin group 220, and a second contact pin group 230.

In a state where the plug connector 200 has been inserted in the host connector 100, the first contact pin group 220 is in contact with the top pin group 120 of the host connector 100, and the second contact pin group 230 is in contact with the bottom pin group 130 of the host connector 100. Thus, in the following description, the first contact pin group 220 is referred to as a top pin group 220, and the second contact pin group 230 is referred to as a bottom pin group 230.

The housing 210 is a component having a plate-like part 211 and a protruding part 212 protruding from the back face of the plate-like part 211 and accommodates and holds the top pin group 220 and the bottom pin group 230.

The housing 210 is a nonconductive member and is molded from a resin or the like, for example.

Figure 24:
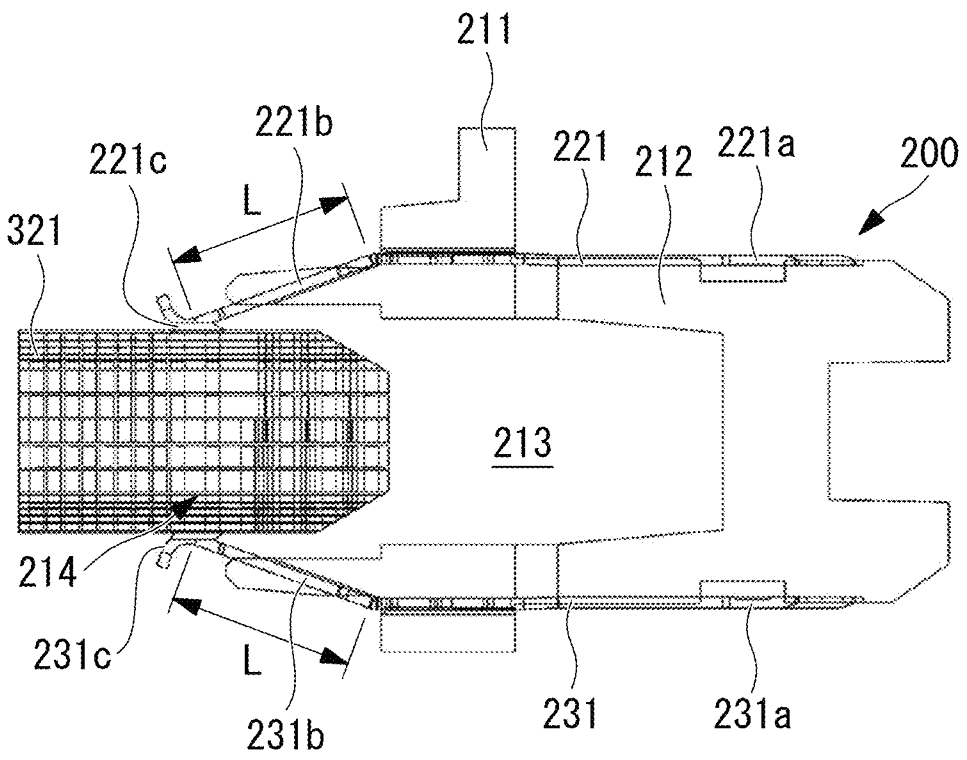
FIG. 24 is a transverse sectional view of the plug connector in which a plug connector substrate has been inserted.

As illustrated in FIG. 24, a substrate insertion space 213 is formed inside the housing 210.

The substrate insertion space 213 is a space in which the plug connector substrate 321 is inserted.

A front opening 214 communicating with the substrate insertion space 213 is opened in the front face of the housing 210.

Figure 25:
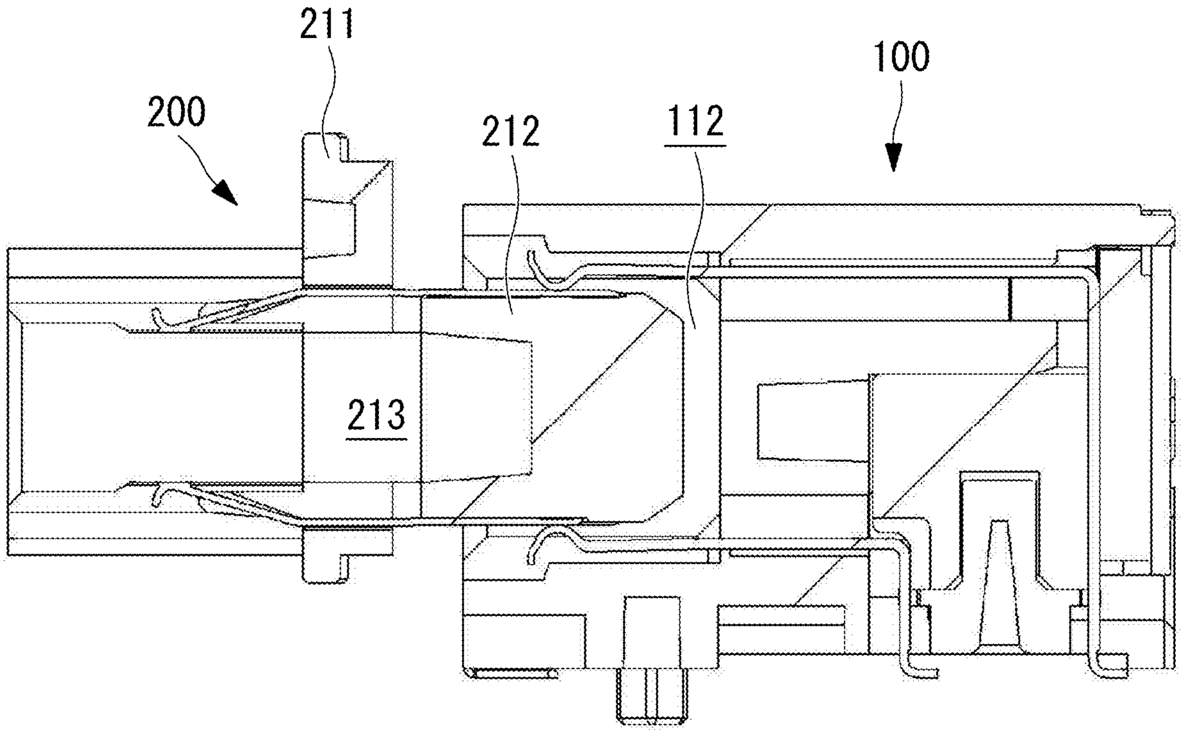
FIG. 25 is a transverse sectional view of the plug connector inserted in the host connector (the cross section through which a contact pin is passed).
Figure 26:
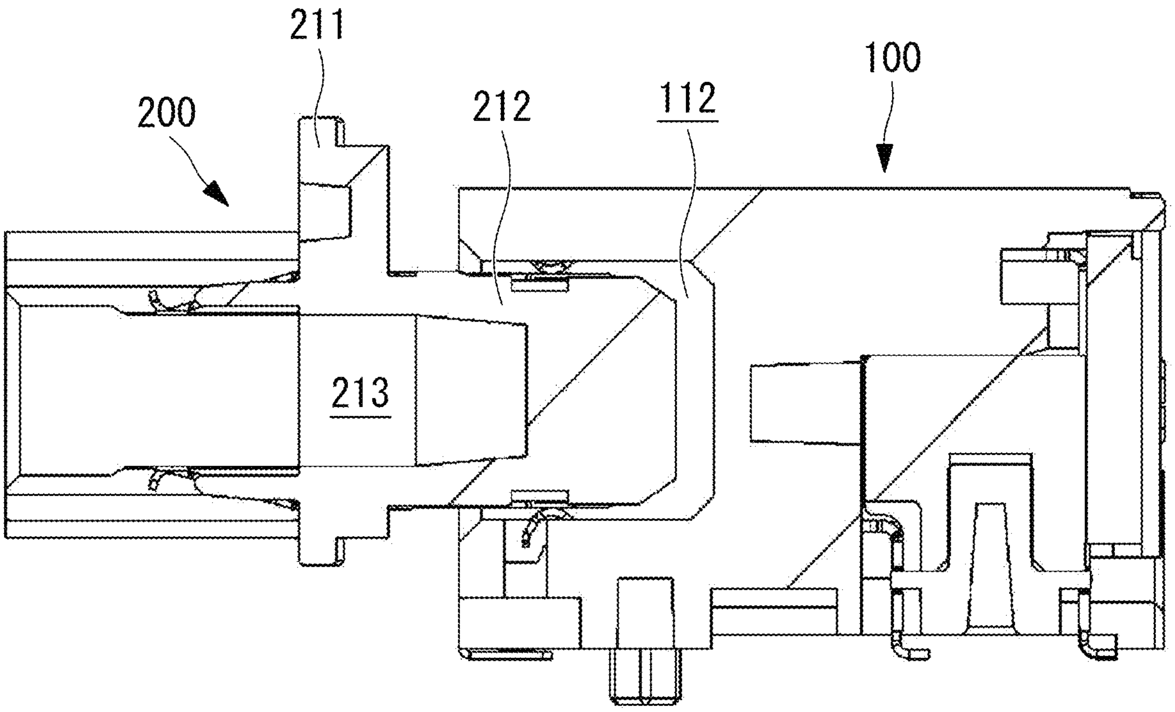
FIG. 26 is a transverse sectional view of the plug connector inserted in the host connector (the cross section through which no contact pin is passed).

As illustrated in FIG. 25 and FIG. 26, the protruding part 212 is a portion inserted in the plug insertion space 112 of the host connector 100.

The tip of the protruding part 212 is formed tapered. This enables easy insertion into the host connector 100.

Figure 27:
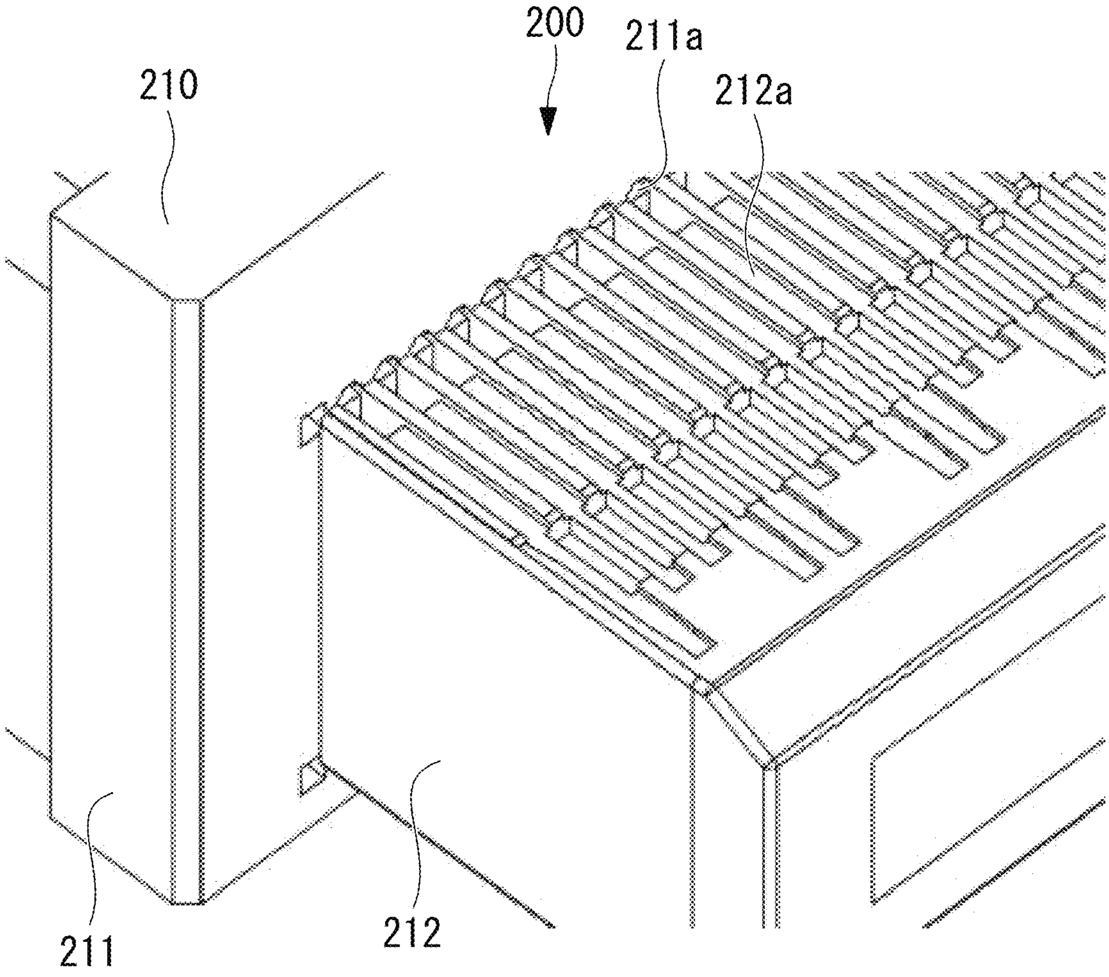
FIG. 27 is an enlarged perspective view of a part of a housing when viewed from above back.

As illustrated in FIG. 27, a plurality of pin grooves 212*a* are formed along the protruding direction of the protruding part 212 (that is, the direction of insertion into the host connector 100) in the top face of the protruding part 212.

The pin groove 212*a* is formed at equal pitches over the longitudinal direction of the housing 210.

Further, similar pin grooves 212*a* are formed in the bottom face of the protruding part 212.

Figure 28:
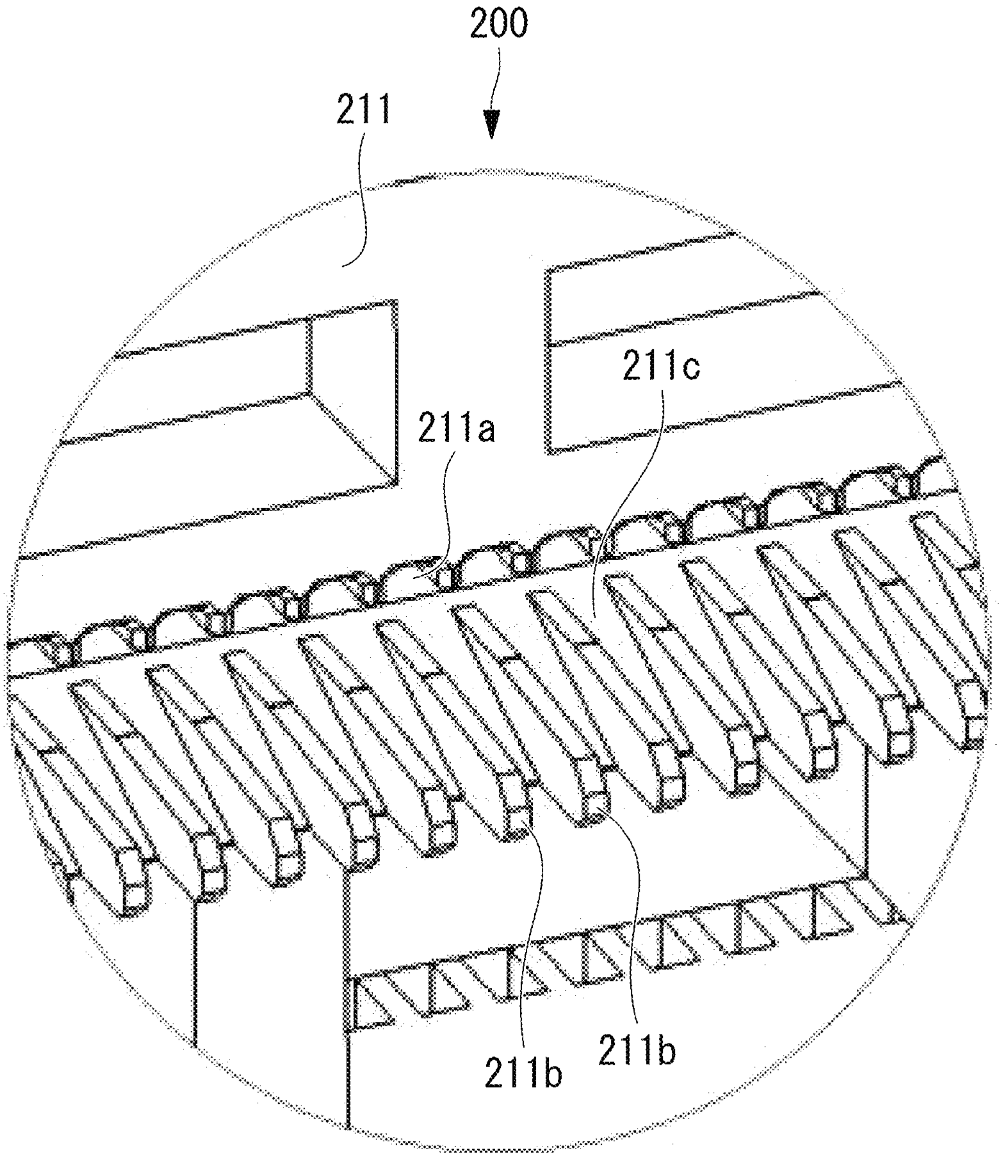
FIG. 28 is an enlarged perspective view of a part of the housing when viewed from above front.

As illustrated in FIG. 27 and FIG. 28, insertion holes 211*a* communicating between the front face and the back face are formed in the plate-like part 211. Each contact pin is inserted in the insertion hole 211*a* from the front face of the plate-like part 211.

The positions of respective insertion holes 211*a* in the longitudinal direction of the housing 210 correspond to the positions of respective pin grooves 212*a* formed in the protruding part 212. Thus, each contact pin inserted in the insertion hole 211*a* passes through each pin groove 212*a* for engagement.

As illustrated in FIG. 28, a plurality of partition parts 121*b* (first wall) and a plurality of slope parts 211*c* (second wall) are formed in the front face of the plate-like part 211.

Each partition part 121*b* is a plate-like wall/rib extending in the insertion direction of a contact pin (extending direction of a contact pin) and erecting in the height direction of the housing 210 and is formed at equal pitches over the longitudinal direction of the housing 210.

Figure 29:
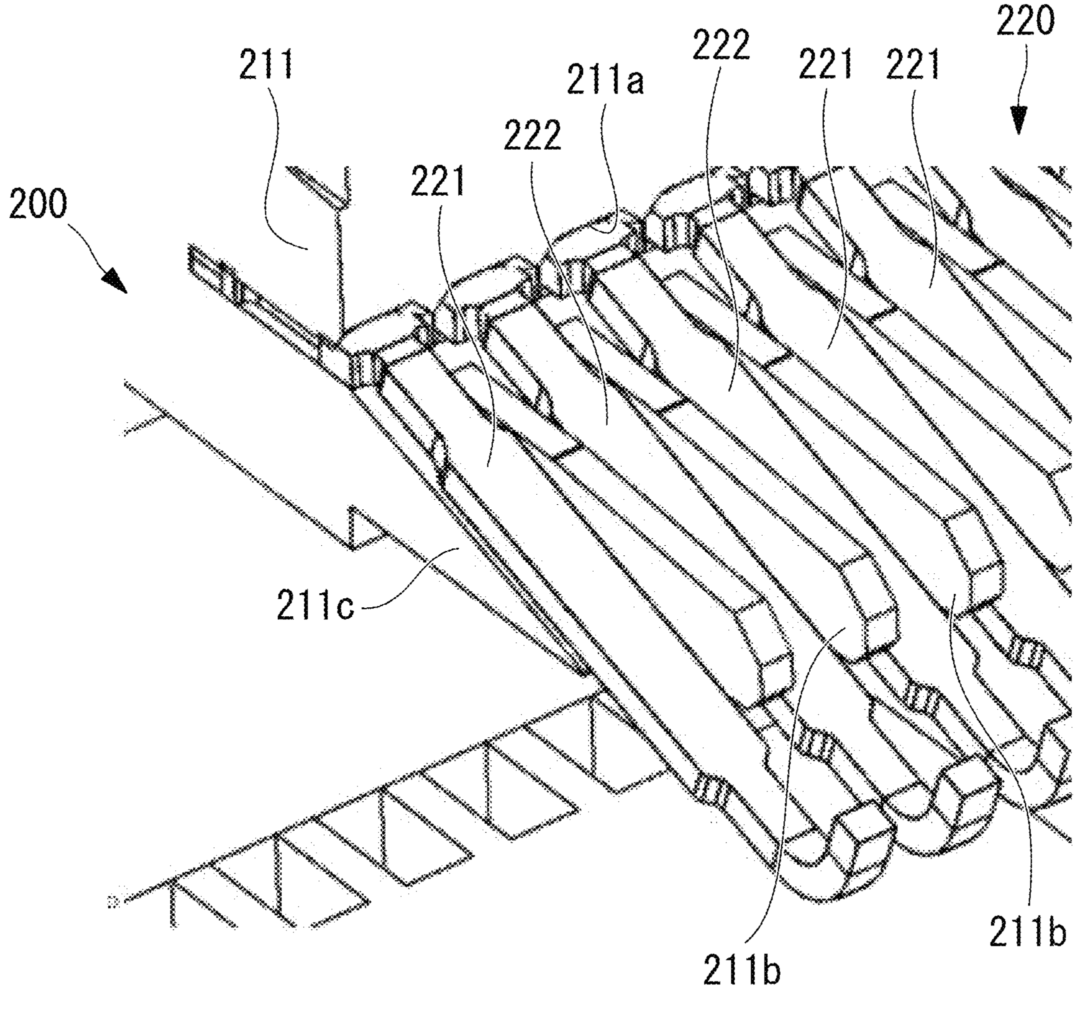
FIG. 29 is an enlarged perspective view of a part of the plug connector when viewed from above front.

The position of a clearance formed between adjacent partition parts 121*b* corresponds to the position of each insertion hole 211*a*. Thus, as illustrated in FIG. 29, each contact pin inserted in the insertion hole 211*a* passes through each clearance formed between the adjacent partition parts 121*b*. In other words, the partition part 211*b* separates adjacent contact pins from each other.

As illustrated in FIG. 28, each slope part 211*c* protrudes in the insertion direction of a contact pin from the front face of the plate-like part 211 and is formed continuously over the longitudinal direction of the housing 210.

In this state, the slope part 211*c* is located in a region of the root portion of the partition part 121*b*. In other words, each partition part 121*b* extends outward in the insertion direction of the contact pin from the slope part 211*c*.

The slope part 211*c* is tapered such that the outward faces on both sides are sloped relative to the horizontal direction. The slope of the slope part 211*c* faces the inner face of the contact pin. Further, the inclination angle (inclination) of the slope approximately corresponds to the inclination angle of each inclined portion 221*b*, 222*b*, 231*b*, 232*b* (described later) in an unloaded state of each contact pin inserted in the insertion hole 211*a* (for example, a state where the plug connector substrate 321 is not inserted).

Thus, the slope part 211*c* can support the inclined portion 221*b*, 222*b*, 231*b*, 232*b* of each contact pin inserted in the housing 210 or prevent each contact pin from being bent inward due to an external load.

Note that other functions of the partition part 121*b* and the slope part 211*c* will be described later.

Figure 30:
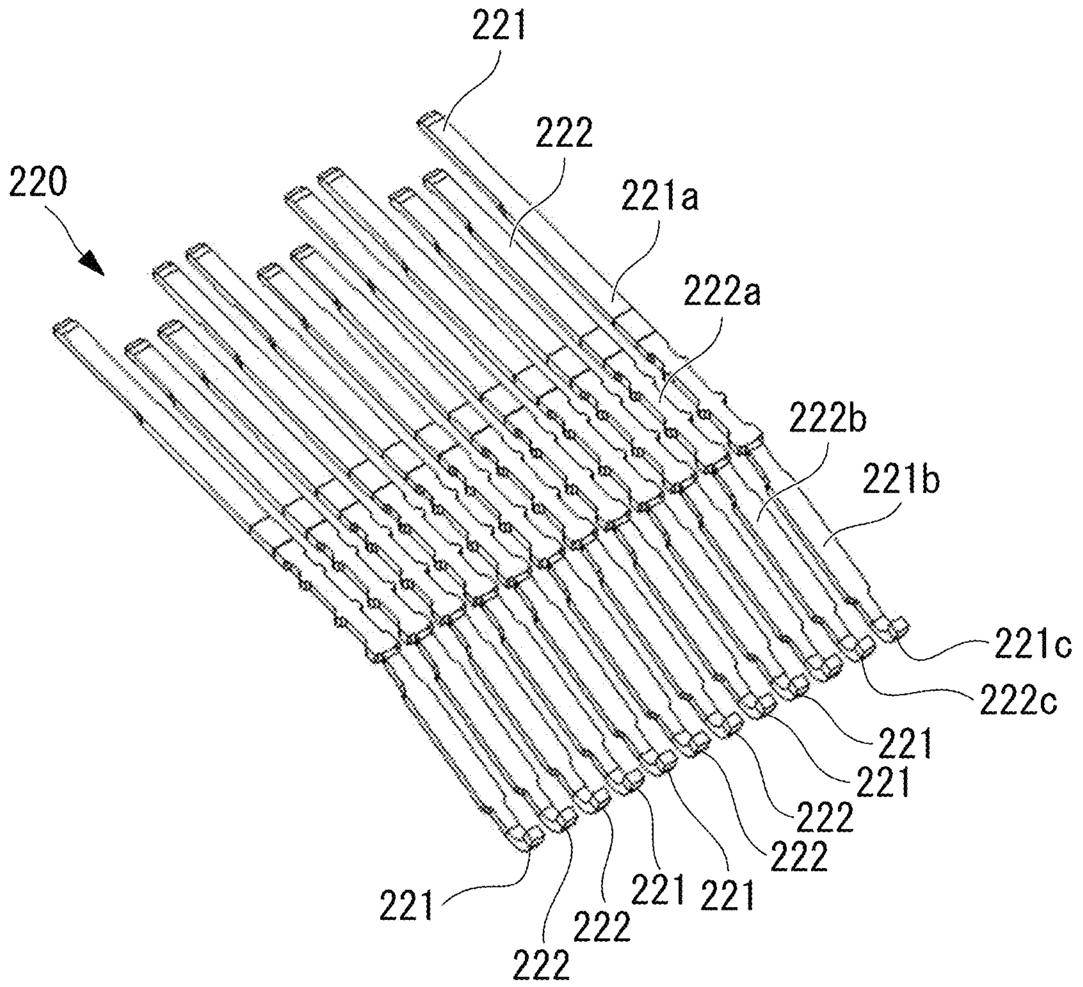
FIG. 30 is a perspective view of a part of the top pin group.

As illustrated in FIG. 30, the top pin group 220 is a group of contact pins configured such that a plurality of top ground pins 221 and a plurality of top signal pins 222 are aligned in the predetermined direction.

In the top pin group 220, the plurality of top ground pins 221 and the plurality of top signal pins 222 are aligned in accordance with the alignment of respective contact pins of the top pin group 120 of the host connector 100. That is, the top pin group 220 is of the double ground configuration corresponding to the top pin group 120 of the host connector 100.

Figure 23:
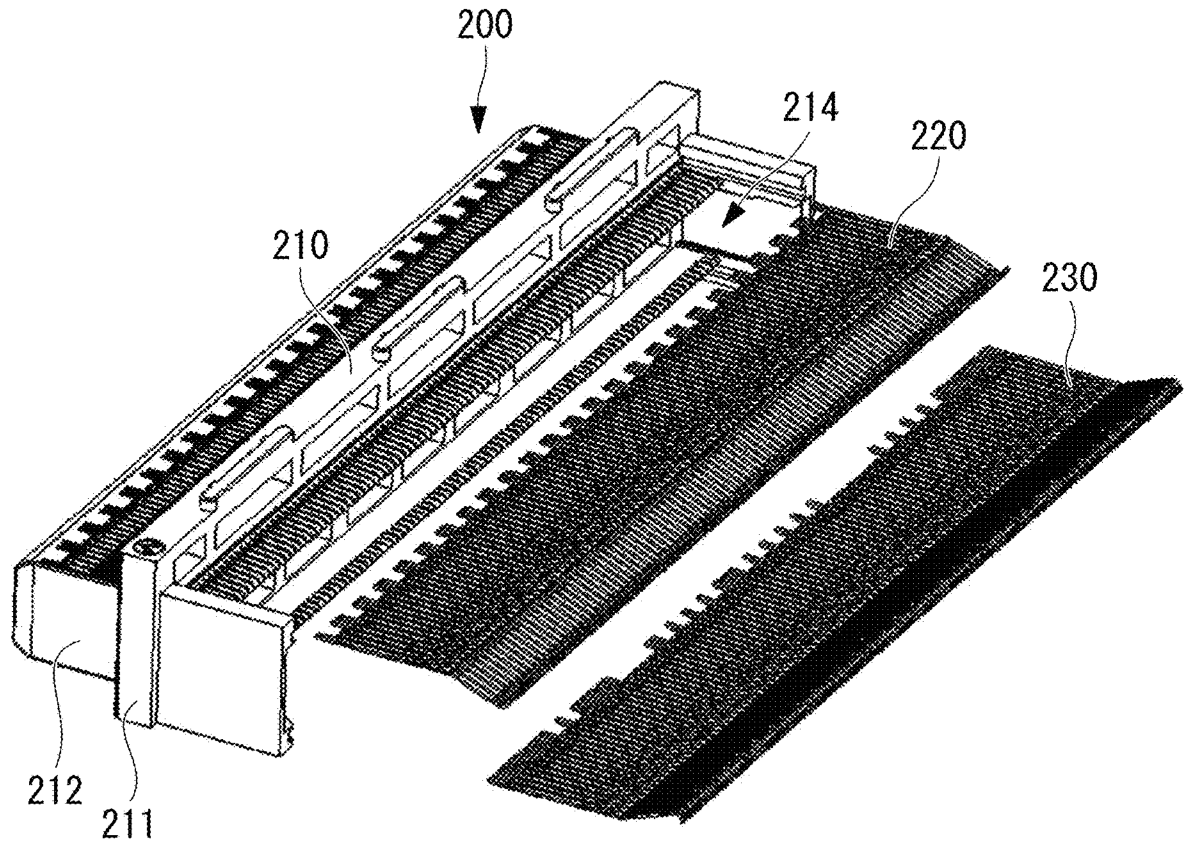
FIG. 23 is an exploded perspective view of the plug connector when viewed from above front.

As illustrated in FIG. 23, the alignment direction of these contact pins of the top pin group 220 matches the longitudinal direction of the housing 210.

As illustrated in FIG. 30, each top ground pin 221 is an elongated metal terminal for electrical conduction and has a base end portion 221*a* and an inclined portion 221*b*.

The base end portion 221*a* is a portion to which the contact point part 121*d* of each top ground pin 121 of the host connector 100 is contacted, and the base end portion 221*a* extends in substantially the horizontal direction.

The base end portion 221*a* passes through the insertion hole 211*a* and the pin groove 212*a* when the top ground pin 221 is held by the housing 210.

The inclined portion 221*b* is a portion inclined relative to the base end portion 221*a*.

A contact point part 221*c* bent convex toward the substrate insertion space 213 (see FIG. 24) is formed on the tip side of the inclined portion 221*b*. The contact point part 221*c* serves as a contact point with the plug connector substrate 321.

When the top ground pin 221 is inserted in and held by the housing 210, the inclined portion 221*b* passes through each clearance formed between adjacent partition parts 211*b* and extends outward from the back face of the plate-like part 211.

Each top signal pin 222 is an elongated metal terminal for electrical conduction and has a base end portion 222*a* and an inclined portion 222*b*.

The configuration of the base end portion 222*a*, the inclined portion 222*b*, and a contact point part 222*c* is the same as the configuration of the base end portion 221*a*, the inclined portion 221*b* and the contact point part 221*c* of the top ground pin 221.

Note that the base end portion 222*a* is contacted to each top signal pin 122 of the host connector 100.

Figure 31:
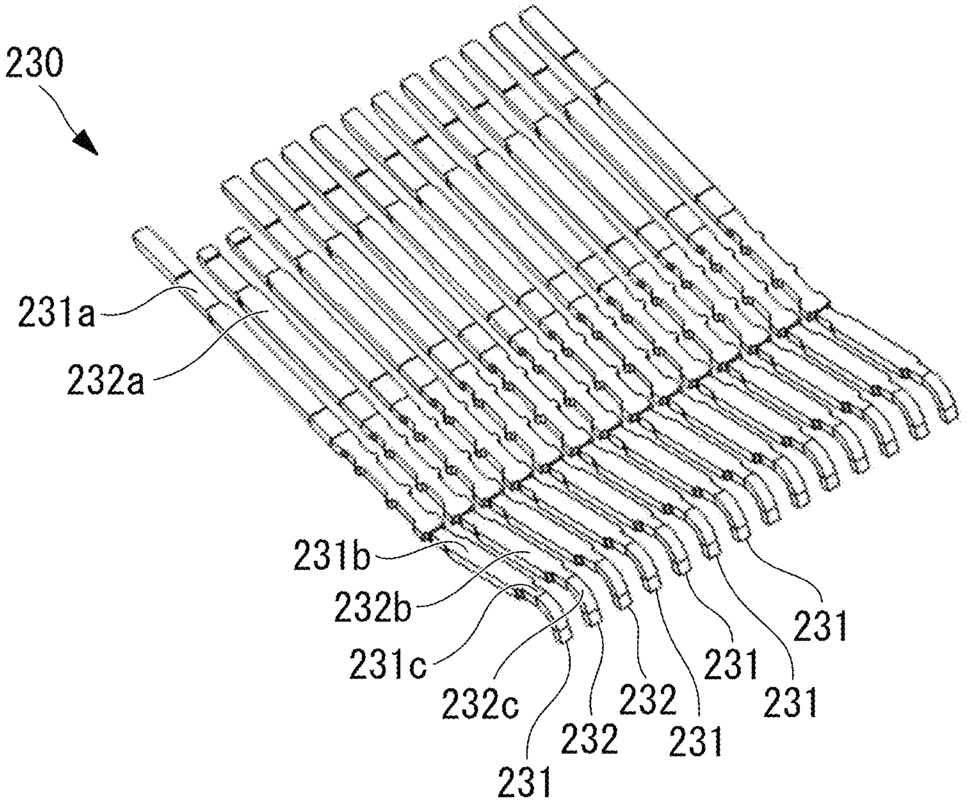
FIG. 31 is a perspective view of a part of the bottom pin group.

As illustrated in FIG. 31, the bottom pin group 230 is a group of contact pins configured such that a plurality of bottom ground pins 231 and a plurality of bottom signal pins 232 are aligned in the predetermined direction.

In the bottom pin group 230, the plurality of bottom ground pins 231 and the plurality of bottom signal pins 232 are aligned in accordance with the alignment of respective contact pins of the bottom pin group 130 of the host connector 100.

As illustrated in FIG. 23, the alignment direction of these contact pins of the bottom pin group 230 matches the longitudinal direction of the housing 210.

As illustrated in FIG. 31, each bottom ground pin 231 is an elongated metal terminal for electrical conduction and has a base end portion 231*a* and an inclined portion 231*b*.

The base end portion 231*a* is a portion to which the contact point part 131*d* of each bottom ground pin 131 of the host connector 100 is contacted, and the base end portion 231*a* extends in substantially the horizontal direction.

The base end portion 231*a* passes through the insertion hole 211*a* and the pin groove 212*a* when the bottom ground pin 231 is held by the housing 210.

The inclined portion 231*b* is a portion inclined relative to the base end portion 231*a*.

A contact point part 231*c* bent convex toward the substrate insertion space 213 (see FIG. 24) is formed on the tip side of the inclined portion 231*b*. The contact point part 231*c* serves as a contact point with the plug connector substrate 321.

When the bottom ground pin 231 is inserted in and held by the housing 210, the inclined portion 231*b* passes through each clearance formed between adjacent partition parts 121*b* and extends outward from the back face of the plate-like part 211.

Each bottom signal pin 232 is an elongated metal terminal for electrical conduction and has a base end portion 232*a* and an inclined portion 232*b*.

The configuration of the base end portion 232*a*, the inclined portion 232*b*, and a contact point part 232*c* is the same as the configuration of the base end portion 231*a*, the inclined portion 231*b* and contact point part 231*c* of the bottom ground pin 231.

Note that the base end portion 232*a* is contacted to each bottom signal pin 132 of the host connector 100.

Figure 21:
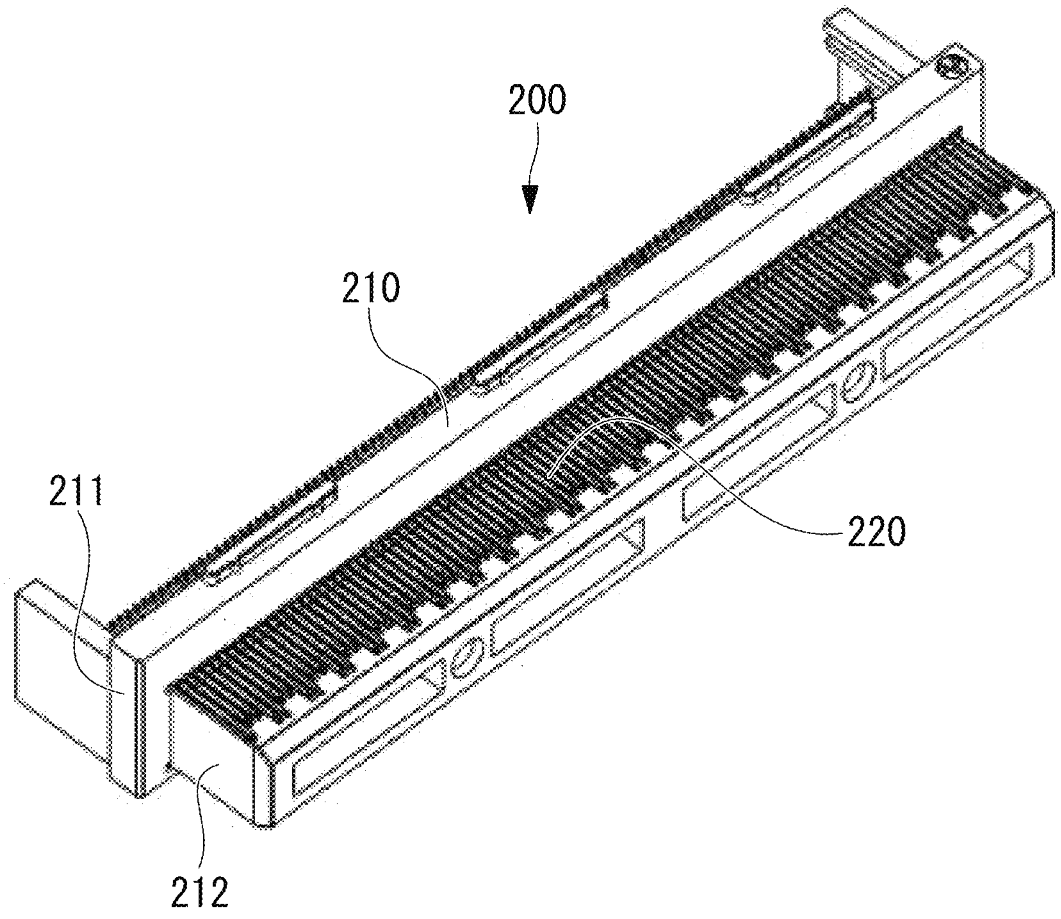
FIG. 21 is a perspective view of a plug connector when viewed from above back.
Figure 22:
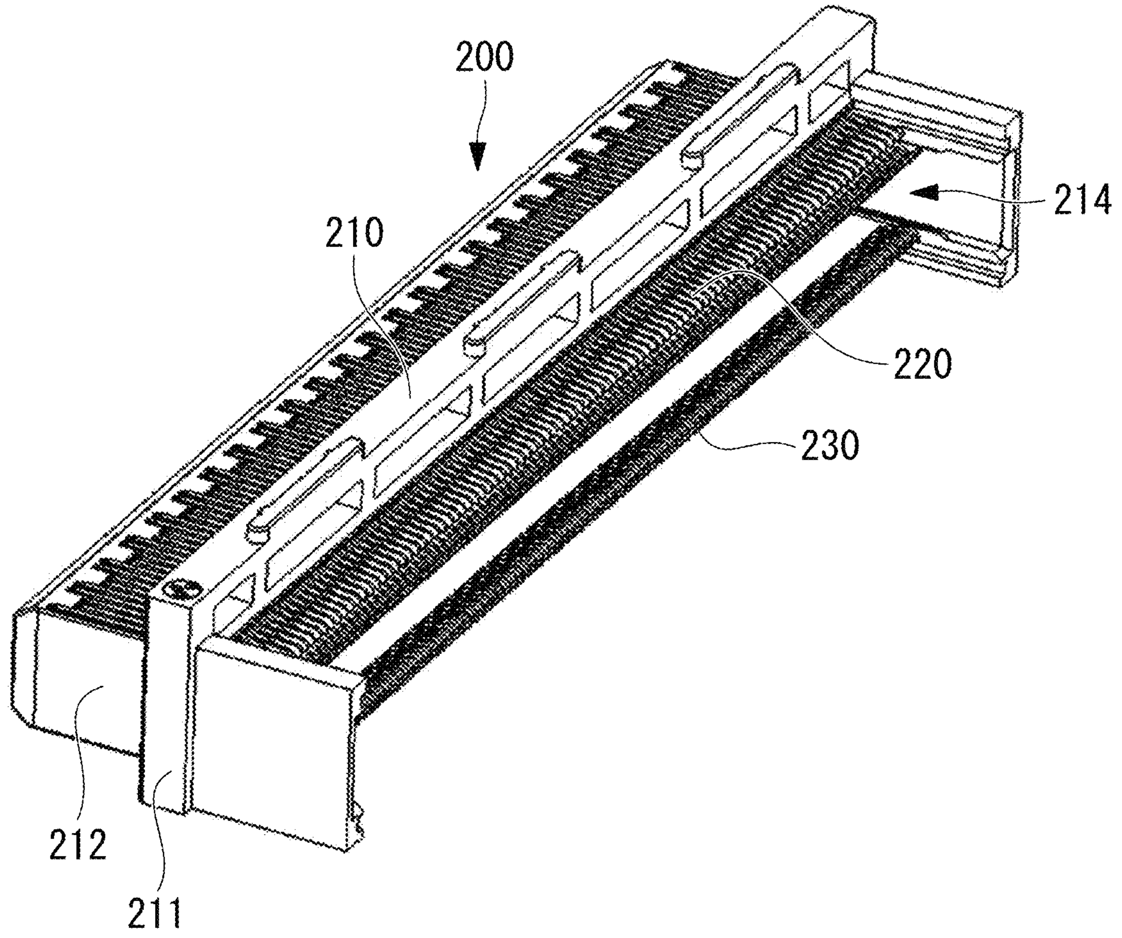
FIG. 22 is a perspective view of the plug connector when viewed from above front.

In a state where the top pin group 220 and the bottom pin group 230 are assembled to the housing 210 and a state where the plug connector 200 is inserted in the host connector 100 mounted on the mount substrate 310, the top pin group 220 (in detail, the inclined portion 221*b* and the inclined portion 222*b*) is arranged so as to be located above the bottom pin group 230 (in detail, the inclined portion 231*b* and the inclined portion 232*b*) and face the bottom pin group 230, as illustrated in FIG. 21 and FIG. 22.

In other words, the bottom pin group 230 is arranged so as to be located below the top pin group 220 and face the top pin group 220. That is, the bottom pin group 230 is arranged at a closer position to the mount substrate 310 than the top pin group 220 (arranged at a position on the mount substrate 310 side) in a state where the plug connector 200 is inserted in the host connector 100.

With such arrangement, more space becomes available above the top pin group 220 in the same manner as the host connector 100.

As illustrated in FIG. 21 and FIG. 22, the housing 210, the top pin group 220, and the bottom pin group 230 configured as described above are assembled, and thereby the plug connector 200 is formed.

<Partition Part and Slope Part>

As illustrated in FIG. 29, a plurality of partition parts 121*b* and a plurality of slope parts 211*c* described above are formed in the housing 210.

Herein, each partition part 121*b* separates adjacent two contact pins from each other. This can reduce crosstalk between these contact pins and enables impedance adjustment.

Further, the impedance adjustment is enabled by the slope part 211*c*. In addition, the slope part 211*c* functions as a portion that reinforces the root of each partition part 121*b*.

<Longitudinal Dimension of Inclined Portion>

As illustrated in FIG. 24, the longitudinal dimension L of the inclined portion 221*b* is preferably larger than or equal to 2 mm, for example.

Herein, the longitudinal dimension L is the distance from the root of the inclined portion 221*b* (the boundary between the inclined portion 221*b* and the base end portion 221*a*) to the contact point part 221*c* formed in the inclined portion 221*b*.

The same applies to other inclined portions 222*b*, 231*b*, 232*b*.

The longitudinal dimension L being 2 mm or larger makes it possible to suitably cope with a change in the plate thickness of the plug connector substrate 321 inserted between the top pin group 220 and the bottom pin group 230.

Adaptation to a change in the plate thickness will be described with reference to FIG. 24 and FIG. 32. Note that this is a specific example.

Figure 32:
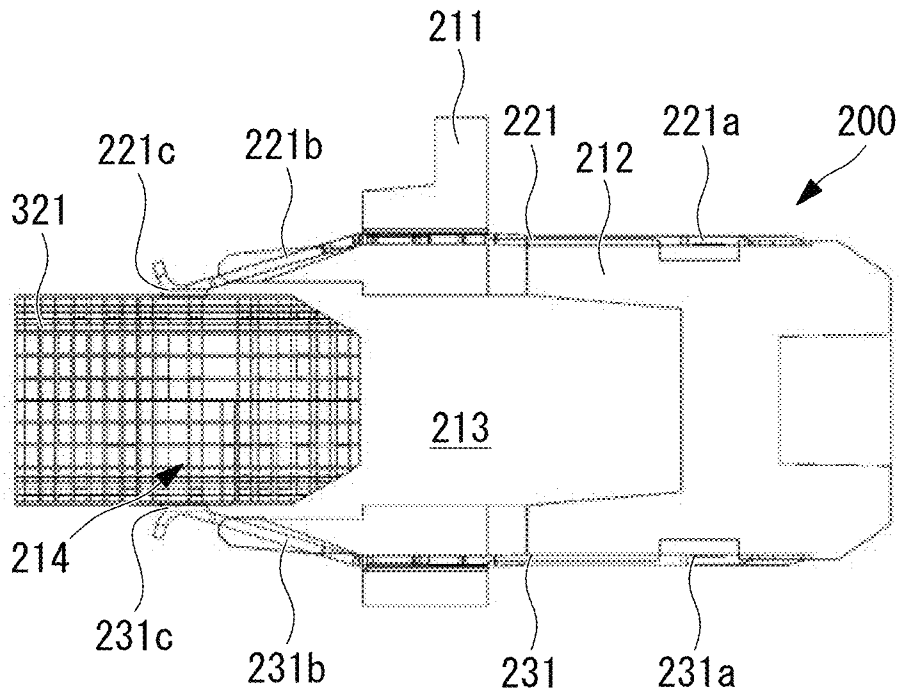
FIG. 32 is a transverse sectional view of the plug connector in which the plug connector substrate has been inserted.

The plug connector substrate 321 illustrated in FIG. 32 has a larger thickness dimension than the plug connector substrate 321 illustrated in FIG. 24.

If the longitudinal dimension L were short (for example, 1 mm or smaller), the bending displacement of the inclined portion 221*b* would be smaller, and thus a larger thickness dimension of the plug connector substrate 321 would cause plastic deformation of the root of the inclined portion 221*b*, for example.

Note that the "bending displacement" is a displacement of the contact point part 221*c* in the top ground pin 221, for example, when the root of the inclined portion 221*b* is a fixed end and the inclined portion 221*b* is elastically rotated and deformed about the fixed end.

In contrast, if the longitudinal dimension L is long (for example, 2 mm or larger), the turning radius of rotation about the fixed end is longer, and the displacement of the contact point part 221*c* is larger.

Thus, a change in the thickness dimension of the plug connector substrate 321 can be absorbed by a bending displacement of the inclined portion 221*b*.

For example, the thickness dimension of the plug connector substrate 321 is larger than or equal to 2 mm and is preferably 3.20±0.32 mm.

[Effect and Advantage of Connector]

According to the connector of the present embodiment, the following advantageous effects are achieved.

Since at least the top pin groups 120, 220 out of the top pin groups 120, 220 and the bottom pin groups 130, 230 have the double ground configuration, crosstalk can be reduced during high-speed transmission in the top pin groups 120, 220.

Figure 33:
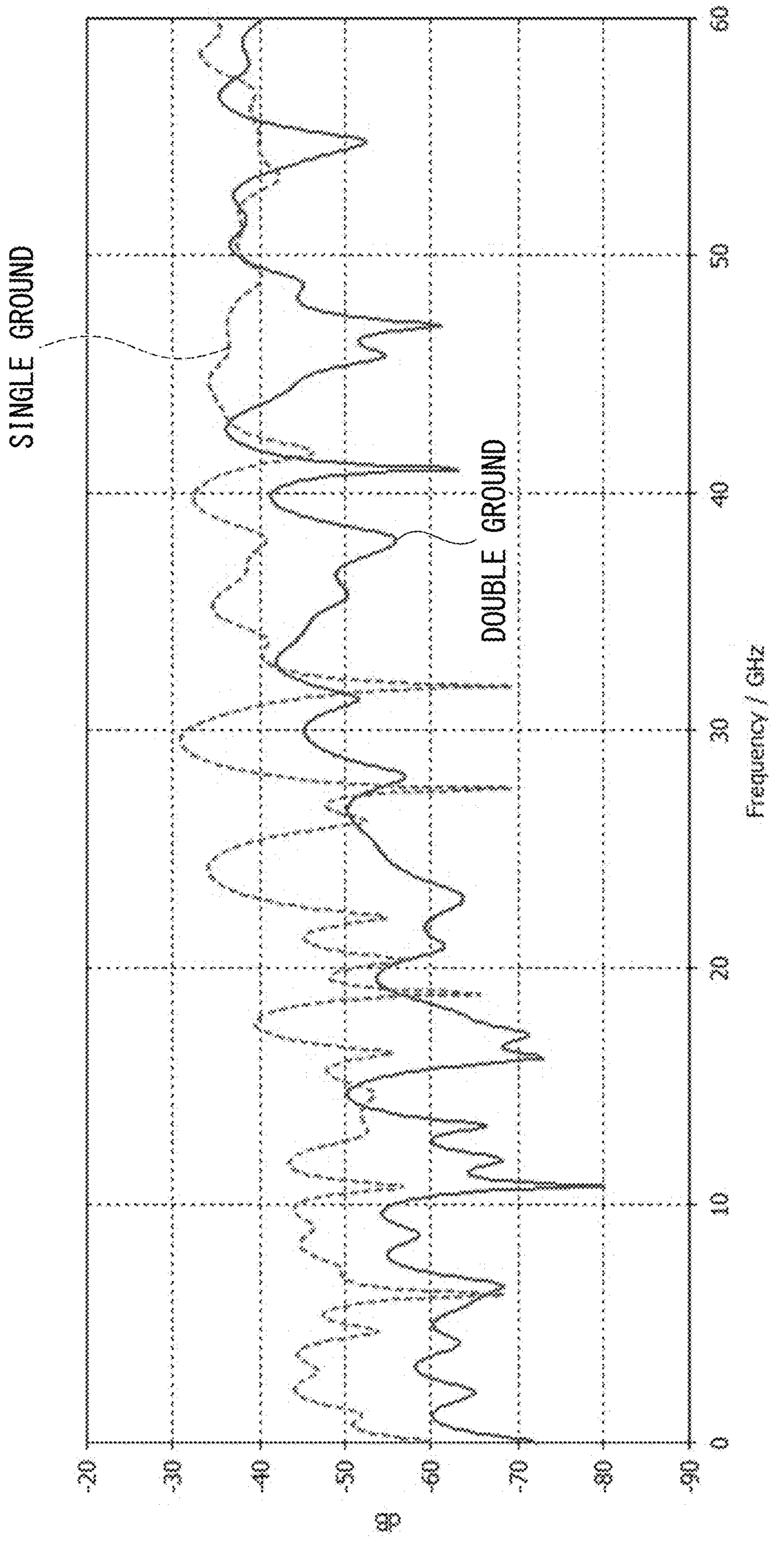
FIG. 33 is a diagram illustrating crosstalk in double ground and single ground (horizontal axis: frequency, vertical axis: crosstalk).

In FIG. 33, crosstalk in the double ground configuration is illustrated by the solid line, and crosstalk in the single ground configuration is illustrated by the dashed line. As can be seen from FIG. 33, crosstalk is reduced when the double ground configuration is employed.

Further, the top pin groups 120, 220 employing the double ground configuration face the bottom pin groups 130, 230 located on the mount substrate 310 side in a state where the host connector 100 is mounted on the mount substrate 310 (or in a state where the plug connector 200 is connected to the host connector 100 mounted on the mount substrate 310), that is, the top pin groups 120, 220 are located above the bottom pin groups 130, 230 above the mount substrate 310. Thus, more space becomes available on the top pin groups 120, 220 side in the connectors 100, 200. Therefore, a space to install the heatsink 323 or the like for cooling heat generated during ultrahigh-speed transmission can be ensured on the top pin groups 120, 220 side.

Note that the "ultrahigh-speed transmission" as used herein refers to high-speed transmission exceeding 100 Gbps using a PAM4 modulation scheme, for example.

Further, since the host connector 100 has the conductive member 140 in contact with adjacent two top ground pins 121, noise can be attenuated by the conductive member 140.

Further, since the ridge 141*a* is formed on the conductive member 140, the area of the conductive member 140 facing adjacent two top ground pins 121 can be increased by the ridge 141*a*.

Further, since the conductive member 140 is in further contact with the bottom ground pins 131, the conductive member 140 is, as a single member, in contact with the top ground pin 121 and the bottom ground pin 131. It is thus possible to reduce the number of components and thus reduce the cost compared to a case where a conductive member contacted to the top ground pin 121 and a conductive member contacted to the bottom ground pin 131 are provided as separate members. Further, the conductive member 140 being formed of a single component can also improve mountability.

Further, since the conductive member 140 has the dimension in the height direction that is larger than or equal to 50% of the dimension of the erect portion 121*b* of the top ground pin 121, the increased volume of the conductive member 140 can improve the noise attenuation performance allowed by the conductive member 140.

Further, since the back plate 160 that holds the erect portion 121*b* of each top ground pin 121 between the back plate 160 and the conductive members 140 is provided, it is possible to push the top ground pin 121 against the conductive member 140 by the back plate 160. This makes it possible to cause the top ground pin 121 to be reliably contacted to the conductive member 140.

Further, since the partition part 211*b* is formed in the housing 210 in the plug connector 200, it is possible to reduce crosstalk and apply impedance adjustment by using the partition part 121*b*.

Further, since the slope part 211*c* is formed to the housing 210 in the plug connector 200, it is possible to apply impedance adjustment by using the slope part 211*c*. Further, the partition part 121*b* is provided so as to extend outward from the slope part 211*c*, and thereby the root of the partition part 121*b* can be reinforced by the slope part 211*c*.

Further, since the inclined portions 221*b*, 222*b*, 231*b*, 232*b* of respective contact pins have the longitudinal dimension L that is larger than or equal to 2 mm in the plug connector 200, it is possible to suitably cope with a change in the thickness dimension of the plug connector substrate 321.

For example, even with a larger thickness dimension of the plug connector substrate 321, such a change in the thickness can be absorbed by the bending displacement of the inclined portions 221*b*, 222*b*, 231*b*, 232*b*.

Note that the double ground configuration of the top pin groups 120, 220 is not an essential configuration in the embodiment described above.

What is claimed is:

1. A connector comprising:

a top pin group having a plurality of contact pins aligned in a predetermined direction; and a bottom pin group having a plurality of contact pins aligned in the predetermined direction, the bottom pin group being arranged so as to face the top pin group and located on a substrate side, wherein each of the contact pins is at least either one of a signal pin used for signaling and a ground pin used for grounding, wherein the top pin group includes a double ground configuration in which sets of signal pins and ground pins are aligned adjacent to each other in the predetermined direction, each of the sets comprising two of the signal pins aligned between two of the ground pins, and wherein the connector further comprises a conductive member electrically connected to adjacent two of the ground pins in the top pin group, the conductive member including a protruding shape arranged between adjacent two of the ground pins in the top pin group.

2. The connector according to claim 1 used for high-speed transmission that is faster than or equal to 100 Gbps.

3. The connector according to claim 1, wherein the conductive member is electrically connected to each of the ground pins of the bottom pin group.

4. The connector according to claim 1, wherein each of the contact pins includes a mount portion mounted on a substrate, an erect portion erecting in substantially a vertical direction from the mount portion, and a substantially-straight portion extending in substantially a horizontal direction from the erect portion and including a contact point with a counterpart terminal, and wherein the conductive member is electrically connected to the erect portion of each of the ground pins of the top pin group.

5. The connector according to claim 4, wherein the conductive member includes a dimension in a height direction that is larger than or equal to 50% of a dimension of the erect portion.

6. The connector according to claim 4, wherein the conductive member is electrically connected to a front face of the erect portion, the connector further comprising a back face member that is located on a back face of the erect portion of each of the ground pins of the top pin group and holds the erect portion of each of the ground pins of the top pin group between the back face member and the conductive member.

7. The connector according to claim 1 further comprising a housing that holds the top pin group and the bottom pin group, wherein each of the contact pins extends outward such that a portion on a tip side including a contact point with a counterpart terminal is inclined from the housing, and wherein a first wall extending in an extending direction of each of the contact pins and separating inclined portions of each of the contact pins extending outward from the housing from each other is formed in the housing.

8. The connector according to claim 7, wherein a second wall extending in the extending direction of each of the contact pins and facing an inner face of the inclined portion of each of the contact pins is formed in the housing.

9. The connector according to claim 1 further comprising a housing that holds the top pin group and the bottom pin group, wherein each of the contact pins extends outward such that a portion on a tip side including a contact point with a counterpart terminal is inclined from the housing, and wherein an inclined portion of each of the contact pins extending outward from the housing includes a length that is larger than or equal to 2 mm from a root to the contact point.

* * * * *